United States Patent
Jung et al.

(10) Patent No.: US 10,805,964 B2
(45) Date of Patent: Oct. 13, 2020

(54) APPARATUS AND METHOD FOR TRANSMITTING A RESERVATION SIGNAL IN A WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Byounghoon Jung, Gyeonggi-do (KR); Jaehong Yi, Seoul (KR); Sunghyun Choi, Seoul (KR); Seung-Hoon Park, Gyeonggi-do (KR); Jungsoo Jung, Gyeonggi-do (KR); Jihoon Kim, Gyeonggi-do (KR); Kangjin Yoon, Seoul (KR)

(73) Assignees: Samsung Electronics Co., Ltd (KR); Seoul National University R&DB Foundation (KR)

(*) Notice: Subject to any disclaimer, the term of this patent is extended or adjusted under 35 U.S.C. 154(b) by 92 days.

(21) Appl. No.: 15/956,366

(22) Filed: Apr. 18, 2018

(65) Prior Publication Data
US 2019/0082474 A1    Mar. 14, 2019

(30) Foreign Application Priority Data
Sep. 14, 2017  (KR) .................. 10-2017-0117870

(51) Int. Cl.
*H04W 16/14*  (2009.01)
*H04W 56/00*  (2009.01)
*H04W 74/08*  (2009.01)
*H04W 72/04*  (2009.01)

(52) U.S. Cl.
CPC ....... *H04W 74/0891* (2013.01); *H04W 16/14* (2013.01); *H04W 56/001* (2013.01); *H04W 74/0808* (2013.01); *H04W 74/0816* (2013.01); *H04W 72/04* (2013.01)

(58) Field of Classification Search
None
See application file for complete search history.

(56) References Cited

U.S. PATENT DOCUMENTS

| 2016/0174109 A1* | 6/2016 | Yerramalli | ............ | H04W 28/26 370/329 |
| 2016/0174222 A1* | 6/2016 | Zhang | .................. | H04L 5/0098 370/329 |
| 2016/0262188 A1* | 9/2016 | Zhang | .................. | H04J 11/0056 |

(Continued)

FOREIGN PATENT DOCUMENTS

KR    2016-0121391    10/2016

*Primary Examiner* — Duc T Duong
(74) *Attorney, Agent, or Firm* — The Farrell Law Firm, P.C.

(57) ABSTRACT

The present disclosure is related to a 5th Generation (5G) or pre-5G communication system for supporting a higher data rate than a 4th Generation (4G) communication system such as Long Term Evolution (LTE). A method for operating a terminal in a wireless communication system is provided which includes receiving downlink data from a base station; performing listen-before-talk (LBT) for uplink transmission; transmitting a first reservation signal based on an end timing of the LBT and a subframe boundary; and transmitting uplink data to the base station based on the subframe boundary.

18 Claims, 23 Drawing Sheets

(56) References Cited

U.S. PATENT DOCUMENTS

| | | | | |
|---|---|---|---|---|
| 2016/0345206 | A1* | 11/2016 | Yerramalli | H04W 74/006 |
| 2016/0381589 | A1* | 12/2016 | Zhang | H04L 5/001 |
| | | | | 370/252 |
| 2017/0041805 | A1* | 2/2017 | Chandrasekhar | |
| | | | | H04W 74/0816 |
| 2017/0086194 | A1* | 3/2017 | Tavildar | H04W 72/0446 |
| 2017/0223635 | A1* | 8/2017 | Dinan | H04W 74/0816 |
| 2017/0325225 | A1* | 11/2017 | Dinan | H04W 72/0446 |
| 2018/0139617 | A1* | 5/2018 | Belghoul | H04W 16/14 |
| 2018/0199374 | A1* | 7/2018 | Ahn | H04W 72/1278 |
| 2018/0279366 | A1* | 9/2018 | Harada | H04W 72/0446 |
| 2018/0343589 | A1* | 11/2018 | Li | H04W 74/08 |
| 2019/0029043 | A1* | 1/2019 | Harada | H04L 5/0044 |
| 2019/0037601 | A1* | 1/2019 | Noh | H04L 27/26 |
| 2019/0261388 | A1* | 8/2019 | Yoon | H04L 1/00 |

\* cited by examiner

APPARATUS AND METHOD FOR TRANSMITTING A RESERVATION SIGNAL IN A WIRELESS COMMUNICATION SYSTEM

PRIORITY

This application claims priority under 35 U.S.C. § 119(a) to Korean Patent Application Serial No. 10-2017-0117870, which was filed in the Korean Intellectual Property Office on Sep. 14, 2017, the entire content of which is incorporated herein by reference.

BACKGROUND

1. Field of the Disclosure

The present disclosure relates generally to a wireless communication system, more particularly, to an apparatus and a method for transmitting a reservation signal in the wireless communication system.

2. Description of the Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

LTE-licensed assisted access (LAA) is a technology which operates an LTE system based on carrier aggregation (CA) of a licensed frequency band and an unlicensed frequency band in order to achieve stable device connection and to improve a data rate. Unlike an LTE cellular system which uses only an allocated licensed band, to coexist with different communication systems (e.g., wireless fidelity (WiFi) and Bluetooth™) which use the unlicensed band, it is required to determine whether an intended channel is allocated to other terminal. The terminal can determine whether the channel is allocated to another node, through listen before talk (LBT) in a clear channel assessment (CCA) slot. When the other node occupies the channel, the terminal can occupy the channel and transmit data after a long delay according to next LBT, which can cause significant performance degradation.

SUMMARY

To address the above-discussed deficiencies of the prior art, an aspect of the present disclosure provides an apparatus and a method for transmitting a reservation signal in a wireless communication system.

Another aspect of the present disclosure provides an apparatus and a method for occupying an inter-transmission channel in a wireless communication system.

Another aspect of the present disclosure provides an apparatus and a method for occupying an intra-transmission channel in a wireless communication system.

Another aspect of the present disclosure provides an apparatus and a method for transmitting a message including necessary information for LBT in a wireless communication system.

In accordance with an aspect of the present disclosure, a method for operating a terminal in a wireless communication system includes receiving downlink data from a base station; performing listen-before-talk (LBT) for uplink transmission; transmitting a first reservation signal based on an end timing of the LBT and a subframe boundary; and transmitting uplink data to the base station based on the subframe boundary.

In accordance with an aspect of the present disclosure, a method for operating a base station in a wireless communication system includes a transceiver; and at least one processor configured to receive downlink data from a base station, perform listen-before-talk (LBT) for uplink transmission, send a first reservation signal based on an end timing of the LBT and a subframe boundary, and transmit uplink data to the base station based on the subframe boundary.

In accordance with an aspect of the present disclosure, an apparatus of a terminal in a wireless communication system includes transmitting downlink data to a terminal; transmitting a first reservation signal based on a transmission end timing, a certain time, and a subframe boundary; and receiving uplink data from the terminal based on the subframe boundary. The certain time is a LBT time of the terminal to transmit the uplink data.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
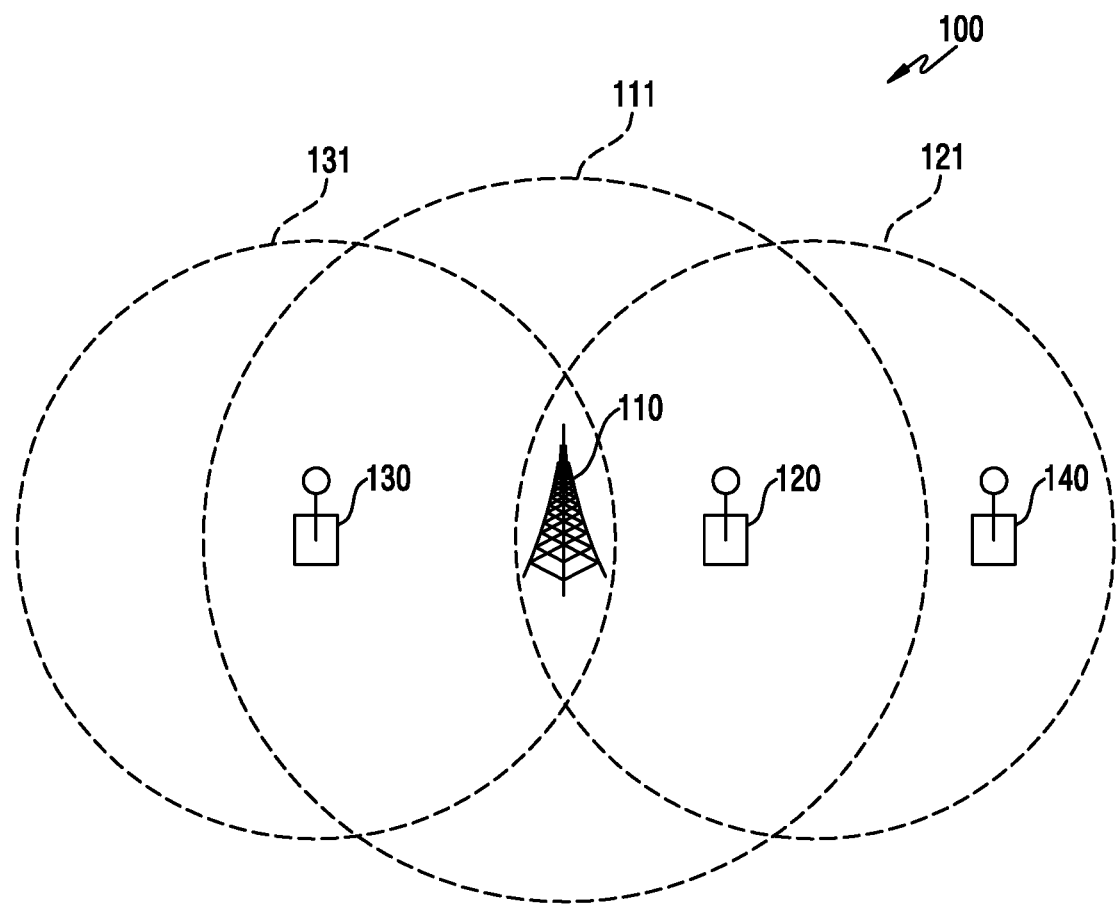
FIG. 1 illustrates a wireless communication system environment, according to various embodiments of the present disclosure.

The terms used herein are merely for the purpose of describing particular embodiments of the present disclosure and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

According to various embodiments of the present disclosure, a hardware approach will be described. However, since the various embodiments of the present disclosure include a technology using both hardware and software, the present disclosure does not exclude a software-based approach.

In the present disclosure, the expressions "A or B" or "at least one of A and/or B" may include all possible combinations of the items listed.

Terms such as "a first", "a second", "the first", or "the second" used in the present disclosure may be used to refer to various elements regardless of the order and/or the importance, and to distinguish the relevant element from other elements, but do not limit the elements. When an element (e.g., first element) is referred to as being "(operatively or communicatively) connected," or "coupled," to another element (e.g., second element), it may be directly connected or coupled directly to the other element or any other element (e.g., third element) may be present between them.

The expression "configured to" used in the present disclosure may be used interchangeably with the expressions "suitable for", "having the capacity to", "designed to", "adapted to", "made to", or "capable of" according to the situation. In some situations, the expression "device configured to" may mean that the device, together with other devices or components, "is able to". For example, the phrase a "processor configured (or set) to perform A, B, and C" may mean a dedicated processor (e.g. embedded processor) only for performing the corresponding operations or a generic-purpose processor (e.g., central processing unit (CPU) or application processor) which can perform the corresponding operations by executing one or more software programs stored in a memory device.

With the increasing use of wireless terminals, a demand for more radio resources has also expanded. To efficiently utilize limited resources, two communication systems of different access methods may share the same resources. When the two communication systems share and coexist in the same band, fairness should be guaranteed between the two communication systems. For the coexistence with the fairness between the two communication systems, a LAA technology including LBT is taught so that one system does not exclusively use a channel. A reservation signal can be used to improve the channel occupation based on the LBT method.

Hereinafter, the present disclosure provides an apparatus and a method for transmitting a reservation signal in a wireless communication system. In particular, the present disclosure provides operations for protecting downlink transmission which exceeds a maximum channel occupation time (COT) in an unlicensed band and preventing channel occupation failure for uplink transmission of a terminal.

Terms used in the present disclosure are defined as follows: "intra-transmission reservation signal" indicates, in successive downlink transmission, a signal transmitted by a base station between downlink transmissions in order to occupy a downlink channel and to protect the downlink transmission; "inter-transmission reservation signal" indicates, in uplink transmission following the downlink transmission, a signal transmitted by the base station or the terminal between the downlink transmission and the uplink transmission in order to occupy an uplink transmission channel and to protect the uplink transmission.

In addition, the present disclosure provides various embodiments using terms defined in, but not limited to, some communication standards (e.g., an LTE system and an LTE-advanced (LTE-A) system defined by 3rd generation partnership project (3GPP), 802.11 system defined by Institute of Electrical and Electronics Engineers (IEEE)). The present disclosure can be modified and applied to other communication systems.

FIG. 1 illustrates a wireless communication environment 100, according to various embodiments of the present disclosure.

Referring to FIG. 1, a base station 110, a first terminal 120, a second terminal 130, and a third terminal 140 are shown as part of nodes which use a radio channel in the wireless communication environment 100. The base station 110, the first terminal 120, the second terminal 130, or the third terminal 140 can support an unlicensed band.

The base station 110 is a network infrastructure which provides radio access to a node residing in coverage area. Herein, the base station can be referred to as an Access Point (AP), an evolved NodeB (eNodeB, eNB), a $5^{th}$ generation (5G) node, a 5G NodeB (NB), a wireless point, a transmission/reception point (TRP), a digital unit (DU), a radio unit (RU), a remote radio head (RRH), or other terms having the technically equivalent meaning.

The base station 110 has coverage area 111 defined as a certain geographical region based on a signal transmission distance. The base station 110 can communicate with a plurality of nodes in the coverage area 111. The base station 110 can communicate with the first terminal 120 or the second terminal 130 which resides in the coverage area 111. The base station 110 can send, but is not limited to, a dummy signal or a WiFi preamble signal for channel occupation of an unlicensed band. Various signals for the channel occupation may be transmitted. Herein, the WiFi preamble can be referred to as a wireless local area network (LAN) preamble.

The first terminal 120, the second terminal 130, or the third terminal 140, which is used by a user, communicate with the base station 110 over a wireless channel. In some cases, the first terminal 120 can be operated without a user involvement. The first terminal 120, the second terminal 130, or the third terminal 140, which performs machine type communication (MTC), may not be carried out with the user involvement. Herein, the first terminal 120, the second terminal 130, or the third terminal 140 can be referred to as a user equipment (UE), a mobile station, a subscriber station, a remote terminal, a wireless terminal, an electronic device, a user device, a node, or other terms having the technically equivalent meaning. The terminal can include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MP3 player, a medical device, a camera, and a wearable device.

Coverage area 121 can indicate a geographical region for the communication of the first terminal 120. The first terminal 120 can communicate with network entities in the coverage area 121. Herein, the network entities can include a terminal different from the first terminal 120 or a base station. The first terminal 120 can communicate with the base station 110 and the third terminal 140 in the coverage area 121. However, the first terminal 120 can not communicate with the second terminal 130 which is outside the coverage area 121.

Coverage area 131 can indicate a geographical region for the communication of the second terminal 130. The second terminal 130 can communicate with network entities in the coverage area 131. The second terminal 130 can communicate with the base station 110 in the coverage area 131. However, the second terminal 130 cannot communicate with the first terminal 120 or the third terminal 140 outside the coverage area 131.

A licensed band and an unlicensed band can coexist in the wireless communication environment 100. The base station 110 and the first terminal 120 (or the second terminal 130, or the third terminal 140) can support the LAA. To operate in the unlicensed band, the base station 110 and the first terminal 120 occupy a channel after the LBT. Hereafter, the channel for the occupation indicates an unlicensed band channel. The base station 110 can confirm that the unlicensed band channel is not occupied through the LBT. The base station 110 can perform intra-transmission LBT. The base station 110 can determine a maximum COT to occupy the unlicensed band. Herein, the maximum COT indicates a maximum time value defined for uplink data transmission and downlink data transmission in the unlicensed band. To occupy the unlicensed band for a long time, the base station 110 can conduct the LBT between the maximum COT and another maximum COT. Before transmitting uplink data, the first terminal 120 can perform the LBT to determine whether the first terminal neighboring node occupies the channel.

Even when the base station 110 or the terminal (e.g., first terminal 120, second terminal 130, or third terminal 130) conducts the LBT before the downlink transmission or the uplink transmission, another node may occupy the channel. Since the downlink transmission or the uplink transmission is performed based on a subframe, there can be a difference between a start timing (or an end timing) of the LBT and a subframe boundary. That is, the other node can occupy the channel due to the resource structure limit before or after the LBT. The following describes a structure of the base station 110 and a structure of the first terminal 120 (or the second terminal 130 or the third terminal 140) for preventing the channel occupation of the other node besides the LBT in FIG. 2 and FIG. 3.

Figure 2:
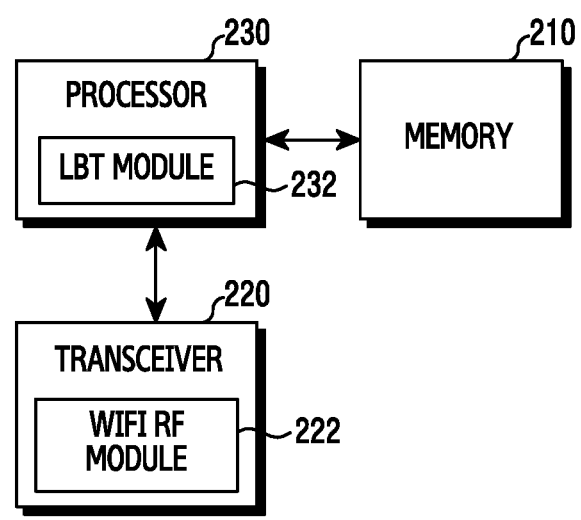
FIG. 2 illustrates a block diagram of a terminal in a wireless communication system, according to various embodiments of the present disclosure.

FIG. 2 illustrates a block diagram of a terminal in a wireless communication system, according to various embodiments of the present disclosure. Configurations of FIG. 2 can be construed as the configuration of the first terminal 120. The terms such as "part" indicate a unit for processing at least one function or operation, and can be implemented using hardware, software, or a combination of hardware and software. While the terminal is taught based on, but not limited to, the first terminal 120, the second terminal 130 and the third terminal 140 can replace the first terminal 120 without affecting the scope of the present disclosure.

Referring to FIG. 2, the first terminal includes a memory 210, a transceiver 220, and a processor 230.

The memory 210 stores a basic program for operating the terminal, an application program, and data such as setting information. The memory 210 can include a volatile memory, a non-volatile memory, or a combination of volatile memory and non-volatile memory. The memory 210 provides the stored data according to a request of the processor 230. According to an embodiment of the present disclosure, the memory 210 can store message information regarding reservation signal transmission, and reception to and from the base station. The first terminal can receive the reservation signal transmission and reception information from the base station before completing downlink transmission, and store the information in the memory 210. Herein, the reservation signal message can include various information such as an entity which sends the reservation signal, timings for transmitting and receiving a next reservation signal, the number of reference signal transmissions and receptions before current downlink transmission is completed, and accurate timing for the LBT.

The transceiver 220 can send and receive signals over a radio channel. The transceiver 220 performs a conversion function between a baseband signal and a bit string according to a physical layer standard of a system. For data transmission, the transceiver 220 generates complex symbols by encoding and modulating a transmit bit string. Also, in data reception, the transceiver 220 restores a receive bit string by demodulating and decoding a baseband signal. Also, the transceiver 220 up-converts the baseband signal to a radio frequency (RF) band signal, transmits it via an antenna, and down-converts an RF band signal received via the antenna to a baseband signal. The transceiver 220 can include a transmit filter, a receive filter, an amplifier, a mixer, an oscillator, a digital to analog convertor (DAC), an analog to digital convertor (ADC), etc.

Also, the transceiver 220 can include a plurality of transmit and receive paths. Further, the transceiver 220 can include at least one antenna array including a plurality of antenna elements. In terms of hardware, the transceiver 220 can include a digital circuit and an analog circuit (e.g., an RF integrated circuit (RFIC)). Herein, the digital circuit and the analog circuit can be implemented in a single package. Also, the transceiver 220 can include a plurality of RF chains. Further, the transceiver 220 can conduct beamforming.

As such, the transceiver 220 sends and receives the signals. Hence, the whole or part of the transceiver 220 can be referred to as a transmitting unit, a receiving unit, or a communication unit. Hereafter, the transmission and the reception over the wireless channel embrace the above-stated processing of the transceiver 220. According to various embodiments of the present disclosure, the transceiver 220 can include a WiFi RF module 222. The WiFi RF module 222 sends a signal including physical layer (PHY) rate and frame length information in a WiFi preamble. That is, the WiFi RF module 222 can include at least one RF chain for generating and transmitting a WiFi signal. Herein, the PHY rate and frame length information contained in the WiFi preamble can be used to predict a transmission end timing of a WiFi frame currently transmitted by a neighboring WiFi node.

The processor 230 controls general operations of the first terminal 120. The processor 230 sends and receives signals through the transceiver 220. Also, the processor 230 records and reads data in and from the memory 210. The processor 230 can conduct protocol stack functions required by a communication standard. For doing so, the processor 230 can include at least one processor or microprocessor, or part of a processor. Part of the transceiver 220 and the processor 230 can be referred to as a communication processor (CP). In particular, the processor 230 controls the first terminal to generate a transport block according to the control information received from the base station, and to map the generated transport block to an allocated uplink resource. According to an embodiment of the present disclosure, the processor 230 can further include an LBT module 232. The LBT module 232 can carry out the LBT. The LBT module 232 controls the terminal to determine whether the channel is unoccupied through channel sensing, when the channel is unoccupied, to communicate by occupying the corresponding channel during the COT, and to sense the channel again.

Figure 3:
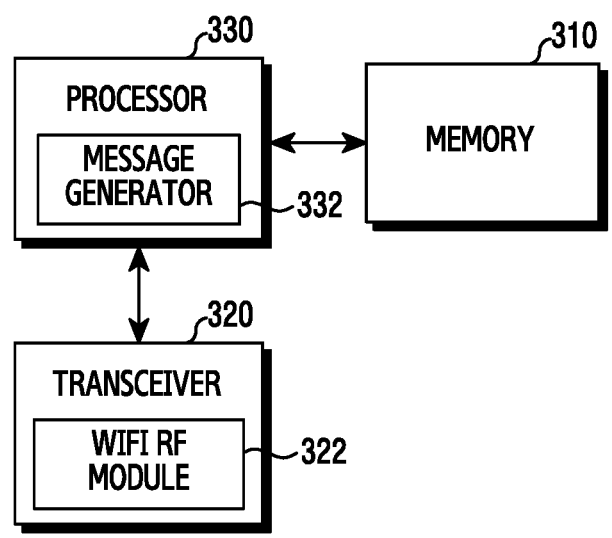
FIG. 3 illustrates a block diagram of a base station in a wireless communication system, according to various embodiments of the present disclosure.

FIG. 3 illustrates a block diagram of a base station in a wireless communication system, according to various embodiments of the present disclosure. Configurations illustrated in FIG. 3 can be construed as the configuration of the base station 110. The terms such as "part" indicate a unit for processing at least one function or operation, and can be implemented using hardware, software, or a combination of hardware and software.

Referring to FIG. 3, the base station includes a memory 310, a transceiver 320, and a processor 330.

The memory 310 stores a basic program for operating the base station, an application program, data such as setting information. The memory 310 can include volatile memory, non-volatile memory, or a combination of volatile memory and non-volatile memory. The memory 310 provides the stored data according to a request of the processor 330.

The transceiver 320 can send and receive signals over a radio channel. The transceiver 320 performs a conversion function between a baseband signal and a bit string according to a physical layer standard of a system. In data transmission, the transceiver 320 generates complex symbols by encoding and modulating a transmit bit string. Also, in data reception, the transceiver 320 restores a received bit string by demodulating and decoding a baseband signal. Also, the transceiver 320 up-converts the baseband signal to an RF band signal, transmits it via an antenna, and down-converts an RF band signal received via the antenna to a baseband signal. The transceiver 320 can include a transmit filter, a receive filter, an amplifier, a mixer, an oscillator, a DAC, an ADC, etc.

The transceiver 320 can include a plurality of transmit and receive paths. Further, the transceiver 320 can include at least one antenna array including a plurality of antenna elements. In terms of the hardware, the transceiver 320 can include a digital unit and an analog unit, and the analog unit can include a plurality of sub-units according to an operating power and an operating frequency.

As such, the transceiver 320 sends and receives the signals. Hence, the whole or part of the transceiver 320 can be referred to as a transmitting unit, a receiving unit, or a communication unit. Hereafter, the transmission and the reception over the wireless channel embrace the above-stated processing of the transceiver 320. According to various embodiments of the present disclosure, the transceiver 320 can include a WiFi RF module 322. The WiFi RF module 322 sends a signal including PHY rate and frame length information in a WiFi preamble. That is, the WiFi RF module 322 can include at least one RF chain for generating and transmitting a WiFi preamble signal. Herein, the PHY rate and frame length information contained in the WiFi preamble can be used to predict a transmission end timing of a WiFi frame currently transmitted by a neighboring WiFi node.

The processor 330 controls the general operations of the base station. The processor 330 sends and receives signals through the transceiver 320. Also, the processor 330 records and reads data to and from the memory 310. The processor 330 can conduct protocol stack functions required by a communication standard. The processor 330 can include at least one controller. According to various embodiments of the present disclosure, the processor 330 can include a scheduler. The scheduler can allocate a resource for the downlink transmission. Also, the scheduler can allocate a resource for the uplink transmission. The scheduler can be an instruction set or codes stored in the memory 310, instructions/code residing in the processor 330 at least temporarily, a storage space storing the instructions/code, or part of a circuitry of the processor 330. The processor 330 can include a message generator 332. The message generator 332 can generate a message notifying reservation signal information to be sent to the first terminal. Specifically, the reservation signal information contained in the message can include various information of an entity which sends the reservation signal, timings for transmitting and receiving a next reservation signal, the number of reference signal transmissions and receptions before current downlink transmission is completed, and accurate timing for the LBT.

Hence, the first terminal 120 can receive the message including the reservation signal information, and determine timings for conducting the LBT and transmitting a reservation signal according to the corresponding information.

Figure 4:
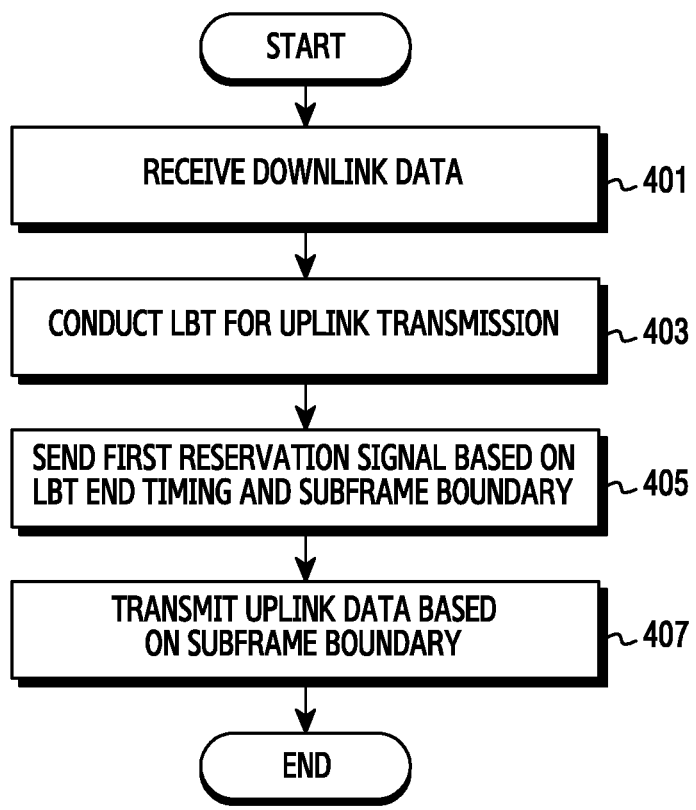
FIG. 4 is a flowchart of operations of a terminal for occupying a channel in a wireless communication system, according to various embodiments of the present disclosure.
Figure 6A:
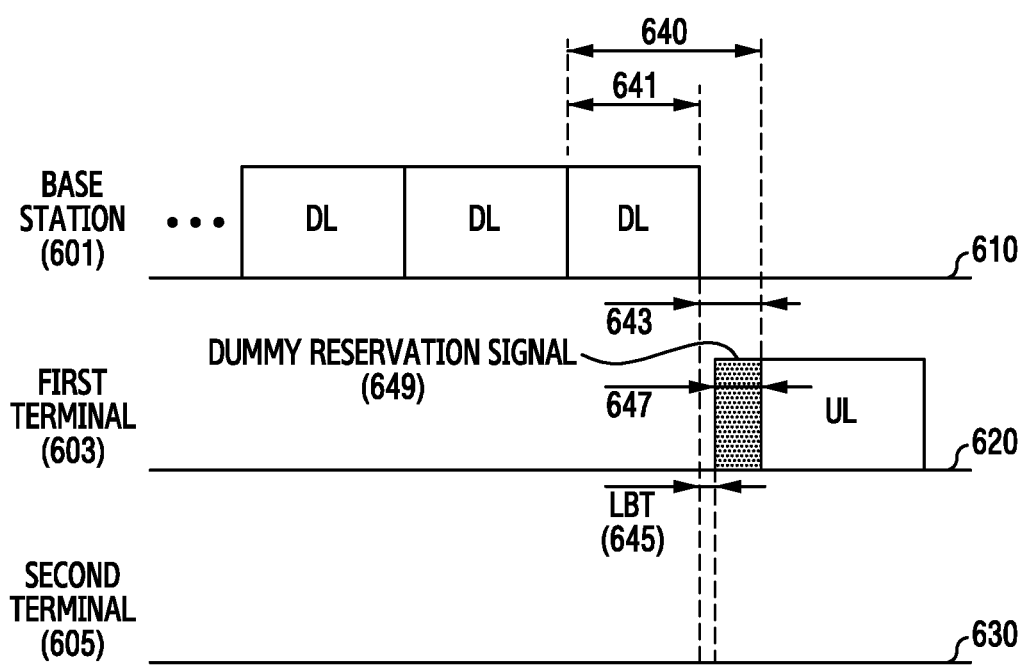
FIGS. 6A and 6B illustrate a subframe for transmitting an inter-transmission reservation signal from a terminal in a wireless communication system, according to various embodiments of the present disclosure.
Figure 6B:
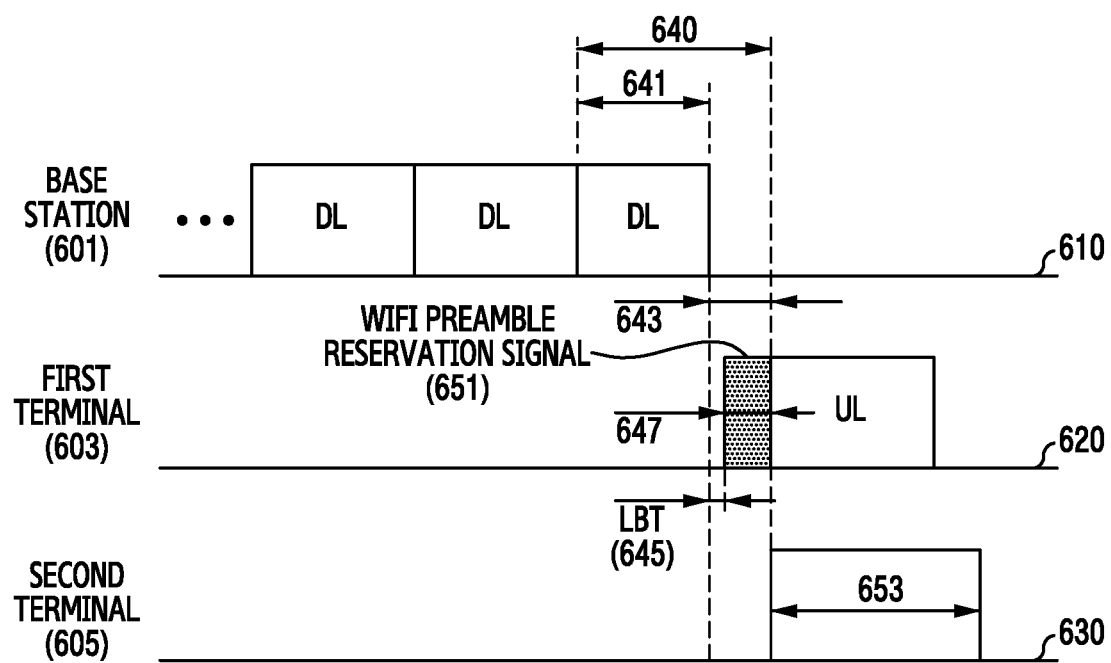
Figure 7:
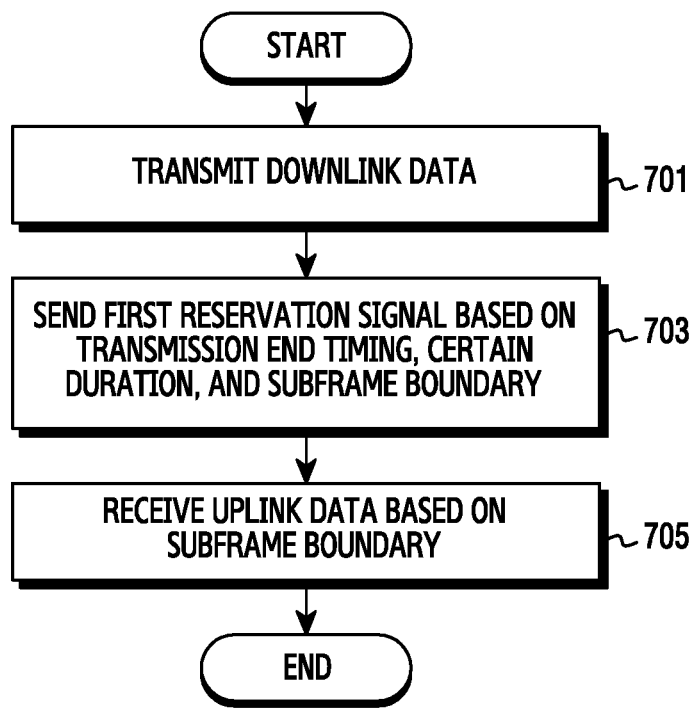
FIG. 7 is a flowchart of operations of a base station for occupying a channel in a wireless communication system, according to various embodiments of the present disclosure.

Inter-transmission (e.g., between the downlink transmission and the uplink transmission) channel occupation is illustrated in FIG. 4 through FIG. 11. FIGS. 4, 5, and 6 illustrate the inter-transmission channel occupation of the terminal, FIGS. 7, 8, and 9 illustrate the inter-transmission channel occupation of the base station, and FIGS. 10, 11, and 12 illustrate the inter-transmission channel occupation of the base station and the terminal.

Inter-Transmission Channel Occupation

FIG. 4 is a flowchart of operations of a terminal for occupying a channel in a wireless communication system, according to various embodiments of the present disclosure. FIG. 4 illustrates an operating method of the first terminal 120.

Referring to FIG. 4, in step 401, the first terminal 120 can receive downlink data. That is, the first terminal 120 can receive the downlink data from the base station over a channel currently occupied by the first terminal 120. According to an embodiment of the present disclosure, the first terminal 120 can be an LAA terminal which performs the LBT to operate in the unlicensed band. The first terminal 120 may not receive the downlink data until a downlink subframe boundary. That is, timing when the first terminal 120 terminates the downlink data reception may not match the downlink subframe boundary. The downlink data reception can finish one symbol length earlier than the downlink subframe boundary. A last subframe of the downlink transmission can be referred to as an ending partial subframe. In case of the ending partial subframe, the downlink data reception of the first terminal 120 can finish more than one symbol earlier. After receiving the downlink data reception, the first terminal 120 can have a certain time interval before performing uplink transmission.

In step 403, the first terminal 120 can perform the LBT for the uplink transmission. That is, the first terminal 120 can perform the LBT to occupy the channel for the uplink transmission following the downlink transmission. For the LBT, the first terminal 120 can determine whether the channel is idle during a CCA slot. For example, the first terminal 120 can perform the LBT of category 2 (e.g., without random backoff) defined by the 3GPP, for 25 µs. Hence, the first terminal 120 can determine whether another node occupies the channel for 24 µs from the downlink data reception end timing.

In step 405, the first terminal 120 can send a first reservation signal based on an LBT end timing and the subframe boundary. That is, the first terminal 120 can send the first reservation signal in an interval from the LBT end timing to the subframe boundary. The LBT end timing of the first terminal 120 can precede the subframe boundary. Herein, the subframe boundary can indicate a subframe start point at which the first terminal 120 initiates the next transmission (e.g., uplink transmission). For example, when the first terminal 120 conducts the LBT of the category 2 for the uplink transmission, the LBT interval is 25 µs and one orthogonal frequency division multiplexing (OFDM) symbol length is 71.3 µs. Hence, when the first terminal 120 conducts the LBT directly after the downlink data reception, the interval from the LBT end timing to the subframe boundary is 46.3 µs. Considering that the LBT time of the category 2 is 25 µs, another node (e.g., an AP of a WLAN) can occupy the channel within 46.3 µs. To synchronize the time, the first terminal 120 can perform the uplink transmission after the subframe boundary and accordingly the time after the LBT end to the subframe boundary is not used for meaning communication is therefore wasted. Hence, the first terminal 120 can send the first reservation signal in order to prevent the other node from occupying the channel and to guarantee the first terminal 120 channel occupation for the uplink transmission. Herein, the reservation signal can be referred to as, but not limited to, a channel occupation signal. The reservation signal can be replaced by other terms having technically equivalent meanings, such as an initial signal, a channel protection signal, and a jamming signal. According to an embodiment of the present disclosure, the reservation signal can include a dummy signal or a WiFi preamble signal. That is, the first terminal 120 can block the other node from occupying the channel by transmitting the reservation signal in the interval from the LBT end timing to the subframe boundary. When the reservation signal is the dummy signal, a node which conducts the LBT can determine that the channel is currently occupied by the other node. When the reservation signal is the WiFi preamble signal, a node which conducts the LBT can determine that the channel is busy and further obtain WiFi frame end timing information based on the PHY rate and WiFi frame length information of the preamble. In this case, since the other node does not send a signal until a corresponding WiFi frame end timing, the channel occupation of the first terminal 120 can be additionally protected.

Notably, when the LBT end timing matches the downlink subframe boundary, the first terminal 120 can transmit uplink data directly after the LBT end. The first terminal 120 may not send the first reservation signal.

In step 407, the first terminal 120 can transmit uplink data based on the subframe boundary. That is, when transmitting the first reservation signal until the subframe boundary frame and reaching the subframe boundary, the first terminal 120 can transmit the uplink data. By transmitting the uplink data based on the subframe boundary, the first terminal 120 can synchronize the time in the scheduling-based uplink transmission.

As such, the first terminal can send the reservation signal to block the other node from occupying the channel. Now, the subframe corresponding to the specific operations of the first terminal is illustrated in FIGS. 5A and 5B.

Figure 5A:
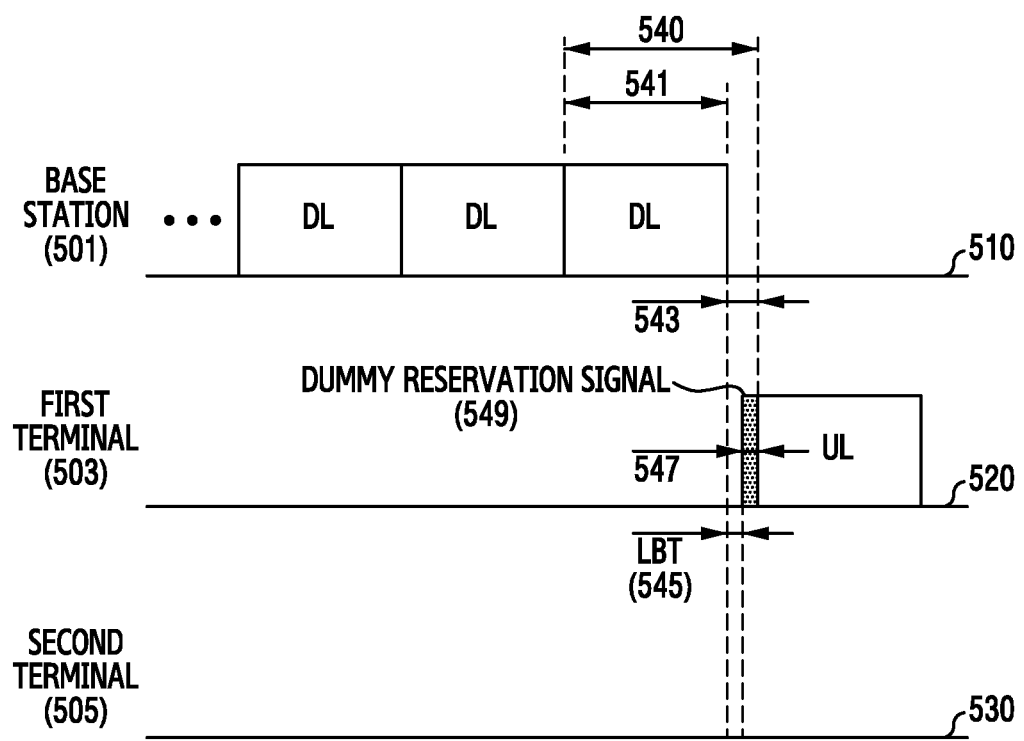
FIGS. 5A and 5B illustrate a subframe for transmitting an inter-transmission reservation signal from a terminal in a wireless communication system, according to various embodiments of the present disclosure.
Figure 5B:
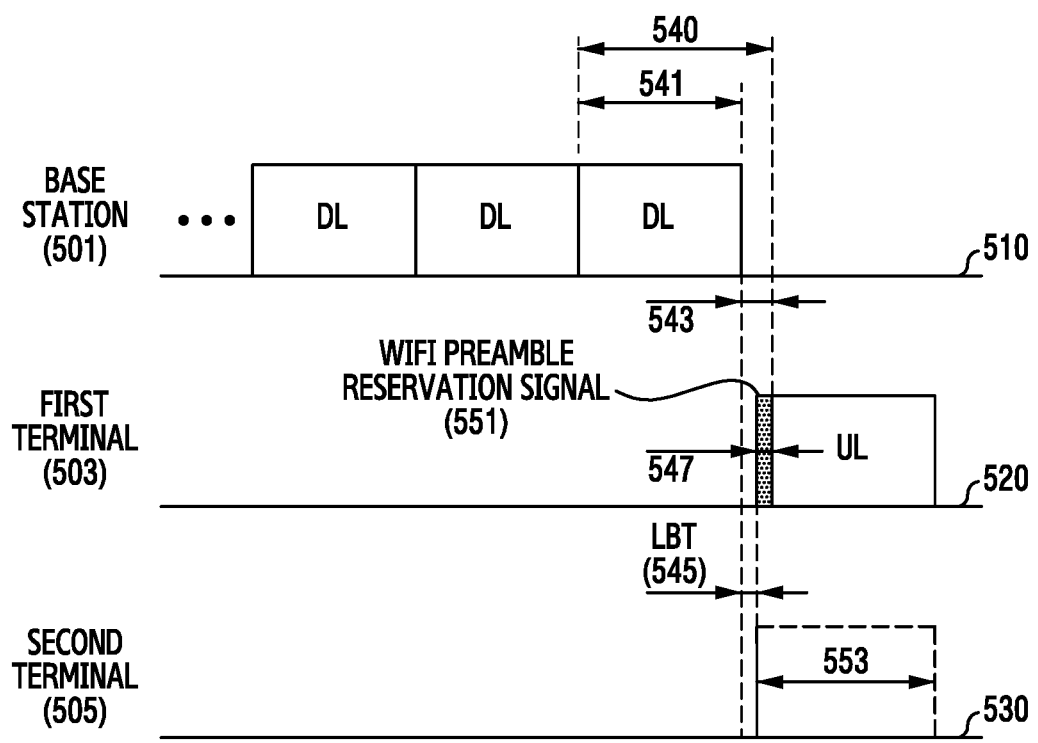

FIG. 5A illustrates a subframe for transmitting an inter-transmission reservation signal from a terminal in a wireless communication system, according to various embodiments of the present disclosure.

Referring to FIG. 5A, a base station 501 can correspond to the base station 110, a first terminal 503 can correspond to the first terminal 120, and a second terminal 505 can correspond to the second terminal 130. The second terminal 505 indicates a neighboring node different from the first terminal 503.

A time axis 510 represents time flow in signaling of the base station 501. Based on the time axis 510, downlink data transmission from the base station 501 to the first terminal 503 is illustrated. The base station 501 can transmit downlink data over a channel occupied by the first terminal 503. A last subframe of the downlink transmission corresponds to an interval 540. The interval 540 corresponding to the last subframe includes an interval 541 which transmits the downlink data. A length of the interval 541 can be determined by a type of the last subframe of the downlink. The downlink last subframe can be a full subframe. The full subframe indicates a subframe of which the length is 1 ms. The full subframe can be the same as other subframes of the frame in length.

For uplink transmission, the first terminal 503 can perform the LBT. After the last subframe of the downlink, the first terminal 503 can initiate uplink transmission. Hence, the base station 501 can transmit downlink data, excluding a last OFDM symbol of the last subframe for the sake of the LBT of the first terminal 503. Since one symbol has a time interval of 71.3 μs based on an LTE communication system, the interval 541 can correspond to a time interval of 13 symbols. An interval 543 can correspond to a time interval of one symbol. Accordingly, the interval 543 is 71.3 μs. The base station 501 can transmit downlink data to the first terminal 503 in the interval 541. The first terminal 503 can detect an end timing of the downlink data reception. The first terminal 503 can pre-acquire information about the last subframe type and the downlink data transmission end timing by signaling with the base station 501. The first terminal 503 can perform the LBT in the last OFDM symbol of the last subframe.

A time axis 520 represents time flow when the first terminal 503 performs signaling. Based on the time axis 520, the first terminal 503 conducts the LBT and occupies the channel to transmit uplink data. When detecting downlink data reception end, the first terminal 503 can perform the LBT. For example, the first terminal 503 can execute the category-2 LBT for 25 μs. When the downlink data reception from the base station 501 ends, the first terminal 503 can perform the LBT in an interval 545.

The first terminal 503 can determine whether the channel is idle. When the channel is idle, that is, when the channel is not occupied by another node such as the second terminal 505, the first terminal 503 can send a dummy reservation signal 549 in an interval 547. The interval 547 can deliver a reservation signal of the first terminal 503. The interval 547 can correspond to an interval before a subframe boundary after the LBT of the first terminal 503 ends. In the interval 547, the first terminal 503 can send a signal for blocking the other node such as the second terminal 505 from occupying the channel. The length of the interval 543 is 71.3 μs corresponding to one OFDM symbol length. Accordingly, the interval 547 can be 46.3 μs excluding the LBT time 25 μs of the first terminal 503.

According to various embodiments of the present disclosure, the reservation signal sent from the first terminal 503 can be the dummy reservation signal 549. The first terminal 503 can broadcast the dummy reservation signal 549 to the other nodes such as the second terminal 505 in the coverage area. For accurate time synchronization, the first terminal 503 can send the reservation signal which is shorter or longer than the time excluding the LBT time from one symbol in consideration of propagation delay. When the second terminal 505 travels in the coverage area of the first terminal 503, the second terminal 505 can receive the dummy reservation signal 549 from the first terminal 503. The second terminal 505 can determine that the channel is presently occupied by the first terminal 503. With the dummy reservation signal 549, the first terminal 503 can notify the busy channel to every node which senses the channel in the area coverage.

A time axis 530 represents time flow of the second terminal 505 where the second terminal 505 communicates in the unlicensed band. The second terminal 505 can perform the LBT in the interval 543. The interval 543 can include the interval 545 or the interval 547. The second terminal 505 can conduct the LBT in the interval 547. The second terminal 505 can detect the dummy reservation signal 549 from the first terminal 503. The second terminal 505 can detect that the other node, that is, the first terminal 503 occupies the channel.

The second terminal 505 can conduct the LBT in the interval 545. The second terminal 505 cannot occupy the channel unless the LBT is conducted immediately after the end of the interval 541. The first terminal 503 can perform the LBT during 25 μs directly after the interval 541 and immediately send the dummy reservation signal 549. Hence, the second terminal 505 can receive the dummy reservation signal 549 from the first terminal 503 before the LBT of 25 μs finishes. The second terminal 505 can determine that another node (e.g., the first terminal 503) occupies the channel. After a certain time passes, the second terminal 505 can execute the LBT for data transmission. Since the second terminal 505 cannot accurately determine the end timing of the downlink data transmission of the base station 501, it is less likely that the second terminal 505 occupies the channel through the LBT in the same time as the first terminal 503. As the first terminal 503 sends the reservation signal, the channel occupation of the first terminal can be ensured.

As such, by transmitting the reservation signal (e.g., the dummy reservation signal 549) until the subframe boundary, the terminal (e.g., the first terminal 503) can block the other node (e.g., the second terminal 505) from occupying the channel and occupy the channel.

FIG. 5B illustrates a subframe for transmitting an inter-transmission reservation signal from a terminal in a wireless communication system according to various embodiments of the present disclosure. In FIG. 5B, the same intervals as those illustrated in FIG. 5A, and the same or similar operations to the operations illustrated in FIG. 5A are omitted.

Referring to FIG. 5B, in the interval 547, the first terminal 503 can send a WiFi preamble reservation signal 551 instead of the dummy reservation signal 549. The WiFi preamble reservation signal 551 is generated by the WiFi RF module of the transceiver of the first terminal 503. A WiFi preamble can include information about the PHY rate and the WiFi frame length. A neighboring node, for example, the second terminal 505 can receive the WiFi preamble reservation signal 551. The second terminal 505 can obtain the PHY rate and WiFi frame length information from the WiFi preamble and thus determine a time interval of the current WiFi frame. For example, the second terminal 505 can determine the time interval of the WiFi frame by dividing the WiFi frame length by the PHY rate. The WiFi preamble reservation signal 551 received from the first terminal 503 can notify the idle channel state to not only a neighboring WiFi node but also a neighboring node which is not a WiFi node. More specifically, the neighboring WiFi node receiving the WiFi preamble reservation signal 551 can obtain that the channel is currently occupied by another node. Also, the neighboring WiFi node can obtain the transmission end timing of the WiFi frame based on the PHY rate and WiFi frame length information. The neighboring node which is not a WiFi node can sense the channel. Hence, the neighboring node which is not a WiFi node may not acquire the information of the WiFi preamble. Instead, the neighboring node which is not a WiFi node can acquire the idle channel information through the channel sensing. That is, by transmitting the WiFi preamble reservation signal 551, the first terminal 503 can block the neighboring node from occupying the channel similarly to the dummy reservation signal 549, restrain the neighboring WiFi node from transmitting, and further protect first terminal 503 uplink transmission.

An interval 553 indicates an uplink transmission interval protected by the WiFi preamble reservation signal 551. A WiFi communication system employs legacy signal (L-SIG) transmission opportunity protection to block signal interference. The WiFi node (e.g., the second terminal 505) which performs the L-SIG protection does not send a signal until the end timing of the WiFi frame currently transmitted by the neighboring node (e.g., the first terminal 503) and thus can prevent signal interference. Since the second terminal 505 does not send a signal to the base station 501 until the end timing of the current WiFi frame according to the L-SIG protection, the uplink transmission between the base station 501 and the first terminal 503 can be further protected.

FIG. 6A illustrates a subframe for transmitting an inter-transmission reservation signal of a terminal in a wireless communication system, according to various embodiments of the present disclosure.

Referring to FIG. 6A, a base station 601 can correspond to the base station 110, a first terminal 603 can correspond to the first terminal 120, and a second terminal 605 can correspond to the second terminal 130. The second terminal 605 is a neighboring node different from the first terminal 603.

A time axis 610 represents time flow in signaling of the base station 601. Based on the time axis 610, the base station 601 transmits downlink data to the first terminal 603. The base station 601 can transmit the downlink data over a channel occupied by the first terminal 603.

A last subframe of the downlink transmission corresponds to an interval 640. The interval 640 corresponding to the last subframe includes an interval 641 which transmits the downlink data.

The interval 641 indicates a downlink data transmission interval of the base station 601. That is, the base station 601 can complete the downlink data transmission before a subframe boundary of a last subframe of the downlink transmission. Herein, a length of the interval 641 can be determined by a type of the last subframe of the downlink. The downlink last subframe can end the downlink data transmission before the full frame illustrated in FIG. 5A. That is, the interval 641 can correspond to a smaller number of symbols than the 13 symbols based on the LTE communication system. The last subframe can be an ending partial subframe. The last subframe can be used for short-transmission time interval (TTI) transmission. The last subframe can be used to send a sounding reference signal (SRS). That is, the downlink data transmission can finish earlier than the transmission excluding the last OFDM symbol, compared with the transmission illustrated in FIG. 5A.

A time axis 620 represents the time flow of operations of the first terminal 603. The first terminal 603 receives the downlink data from the base station 601. When completing the downlink data reception, the first terminal 603 can perform the LBT to occupy the channel for uplink transmission. When the channel is idle according to the LBT, the first terminal 603 can occupy the channel and transmit uplink data to the base station 601. Notably, the first terminal 603 can transmit the uplink data after the subframe boundary. Accordingly, the first terminal 603 needs to block the idle channel state from the LBT completion to the subframe boundary.

An interval 643 ranges from the downlink data transmission end timing to the subframe boundary of the last subframe of the downlink. That is, the interval 643 finishes the downlink data transmission and initiates the uplink transmission of the base station 601 and the first terminal 603. The interval 643 can be determined by the type of the last subframe of the downlink transmission. When the last subframe of the downlink transmission is the ending partial subframe, the interval 643 can be a greater than one symbol length 71.3 μs. The length of the interval 643 can be determined by a downlink data size transmitted to the first terminal 603 and an allocated downlink frame length.

An interval 645 corresponds to the LBT interval of the first terminal 603. That is, the first terminal 603 can perform the LBT in the interval 645 in order to occupy the channel for the uplink transmission. The first terminal 603 can conduct the category-2 LBT for 25 μs. Thus, the interval 645 can be 25 μs in length. The first terminal 503 can pre-acquire information about the last subframe type and the downlink data transmission end timing by signaling with the base station 601. The first terminal 603 can perform the LBT at the downlink data transmission end timing of the ending partial subframe.

An interval 647 delivers a dummy reservation signal 649 from the first terminal 603. To block another node (e.g., the second node 605) from occupying the channel, the first terminal 603 can send the dummy reservation signal 649. After finishing the LBT, the first terminal 603 can send the dummy reservation signal 649 in an interval before the uplink transmission. That is, the first terminal 603 can send the dummy reservation signal 649 from the LBT end timing to the subframe boundary of the downlink transmission. Herein, it is noted that the subframe boundary of the downlink transmission matches the uplink subframe boundary. The first terminal 603 can identify the idle channel state through the LBT in the interval 645. The first terminal 603 can transmit uplink data after the subframe boundary to synchronize the time of the schedule-based uplink. When the first terminal 603 does not send the reservation signal from the LBT end timing to the subframe boundary, the channel can be idle in the interval 647. When a last subframe of the downlink transmission is an ending partial subframe, the interval 643 corresponding to the idle channel is longer than one symbol but the interval 647 delivering the dummy reservation signal 649 can be longer than one OFDM symbol because the LBT time is fixed to 25 μs. To block a neighboring node, such as the second terminal 605, from occupying the channel, the first terminal 603 can broadcast the dummy reservation signal 649 to every node in the coverage area. For accurate time synchronization, the first terminal 603 can send the reservation signal which is shorter or longer than the time excluding the LBT time by considering the propagation delay. The neighboring node such as the second terminal 605 can receive the dummy reservation signal 649 and thus determine that the channel is presently occupied by another node (e.g., the first terminal 603). As the downlink transmission ends earlier than the defined subframe length, the channel idle time can increase. In spite of the increased channel idle time, the reservation signal can be transmitted to protect the channel occupation of the first terminal 603.

FIG. 6B illustrates a subframe for transmitting an inter-transmission reservation signal from a terminal in a wireless communication system, according to various embodiments of the present disclosure. In FIG. 6B, the same intervals as those illustrated in FIG. 6A and the same or similar operations to the operations illustrated in FIG. 6A are omitted.

Referring to FIG. 6B, in the interval 647, the first terminal 603 can send a WiFi preamble reservation signal 651 instead of the dummy reservation signal 649. As mentioned above, the WiFi preamble can include the information about the PHY rate and the WiFi frame length. A neighboring node, for example, the second terminal 605 can receive the WiFi preamble reservation signal 651 from the first terminal 603 during the LBT for the channel occupation. The second terminal 605 can determine that the channel is currently occupied by the neighboring node, for example, the first terminal 603. Hence, the second terminal 605 can perform the LBT for data transmission after a certain time elapses.

An interval 653 indicates an L-SIG protection interval of the second terminal 605. The second terminal 605 can receive the WiFi preamble reservation signal 649 from the first terminal 603 in the interval 647. The second terminal 605 obtains the information about the PHY rate and the WiFi frame length from the received preamble. The second terminal 605 can determine a duration time and an ending time of the WiFi frame by dividing the WiFi frame length by the PHY rate. Herein, the determined WiFi frame duration time can correspond to the interval 653. The second terminal 605 can perform the L-SIG protection in the determined WiFi frame duration time from the transmission end timing of the WiFi preamble reservation signal 651 from the first terminal 603. That is, to protect the uplink transmission between the base station 601 and the first terminal 603, the second terminal 605 does not send a signal in the interval 653 and thus avoids inter-signal interference. As a result, the channel occupation of the first terminal 603 can be protected from other nodes.

FIG. 7 is a flowchart of operations of a base station 110 for occupying a channel in a wireless communication system, according to various embodiments of the present disclosure. FIG. 7 illustrates an operating method of the base station 110.

Referring to FIG. 7, in step 701, the base station 110 can transmit downlink data. That is, the base station 110 can transmit the downlink data to the first terminal 120. The base station 110 can complete the data transmission before a last subframe boundary by considering an LBT time of the first terminal 120 for uplink transmission after the downlink. That is, the subframe boundary can be different from the data transmission end timing. According to an embodiment of the present disclosure, the base station 110 can transmit the data excluding a last symbol of the last subframe by considering the LBT time of the first terminal 120. The base station 110 can complete data transmission more than one symbol earlier. In this case, the last subframe can be referred to as the ending partial subframe.

In step 703, the base station 110 can send a first reservation signal based on a transmission end timing, a certain duration, and a subframe boundary. That is, the base station 110 can determine a length of an interval for transmitting the first reservation signal and send a signal by considering a downlink data transmission end timing, an LBT time of the first terminal 120, and the subframe boundary. According to an embodiment of the present disclosure, the base station 110 can send the first reservation signal during another time than the LBT time of the first terminal 120. When the last subframe of the downlink transmission is a full subframe, the last symbol interval can be excluded from the downlink data transmission. Hence, the base station 110 can determine a transmission interval of the first reservation signal such that the first terminal 120 can initiate uplink transmission directly after the LBT. In this case, the base station 110 can send the first reservation signal for 46.3 μs directly after the downlink data transmission ends. The base station 110 can determine a transmission interval of the first reservation signal by considering a second reservation signal received from the first terminal 120. The first terminal 120 can receive the first reservation signal from the base station 110, conduct the LBT, and send the second reservation signal. In this case, the first terminal 120 can send the second reservation signal from the LBT end to the subframe boundary, and then immediately transmit uplink data at the subframe boundary. Hence, the base station 110 can have the flexibility to send the first reservation signal based on the LBT time of the first terminal 120 and the transmission time of the second reservation signal.

In step 705, the base station 110 can receive the uplink data based on the subframe boundary. That is, since the first terminal 120 transmits the uplink data based on the subframe boundary, the base station 110 can receive the uplink data of the first terminal 120 according to the subframe boundary.

As such, the base station 110 can send the reservation signal to block the other node from occupying the channel.

Figure 8A:
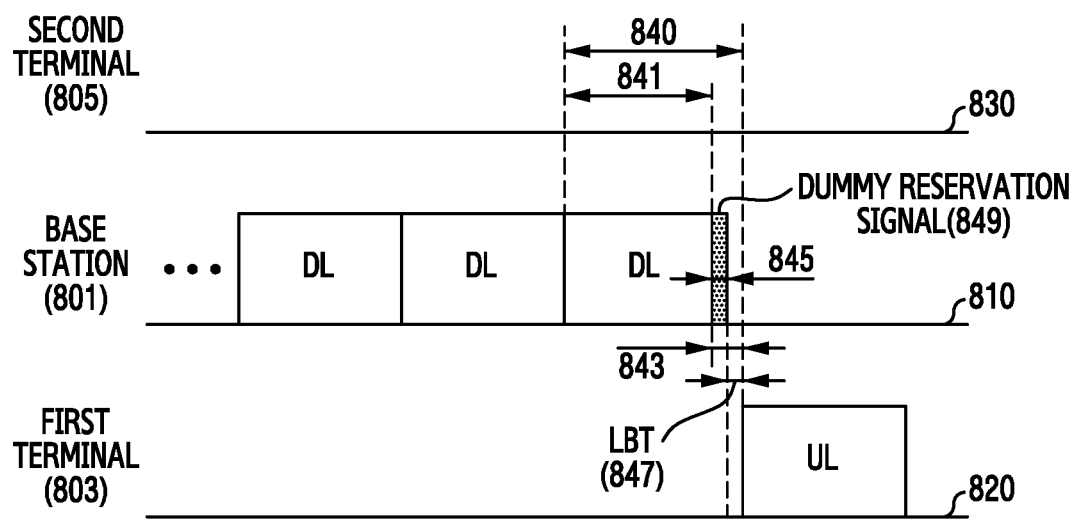
FIGS. 8A and 8B illustrate a subframe for transmitting an inter-transmission reservation signal from a base station in a wireless communication system according to various embodiments of the present disclosure.

FIG. 8A illustrates a subframe for transmitting an inter-transmission reservation signal from a base station 801 in a wireless communication system, according to various embodiments of the present disclosure.

Referring to FIG. 8A, a base station 801 can correspond to the base station 110, a first terminal 803 can correspond to the first terminal 120, and a second terminal 805 can correspond to the second terminal 130. The second terminal 805 indicates a neighboring node different from the first terminal 803.

A time axis 810 represents time flow in signaling from the base station 801. The base station 801 can transmit downlink data over a channel occupied by the first terminal 803. A last subframe of the downlink transmission corresponds to an interval 840. The interval 840 corresponding to the last subframe includes an interval 841 which carries the downlink data. The length of the interval 841 can be determined by a type of the last subframe of the downlink transmission. The downlink last subframe can be a full subframe. An interval 843 excluding the downlink data transmission interval from the interval 840 can correspond to one last OFDM symbol length.

After transmitting the downlink data, the base station 801 can send a reservation signal. The base station 801, which determines the downlink data transmission end timing, can send a reservation signal in an interval 845 directly after the downlink data transmission. The reservation signal sent by the base station 801 can be a dummy reservation signal 849. According to an embodiment of the present disclosure, the base station 801 can determine the interval 845 so that the first terminal 803 can transmit uplink data directly after the LBT. For example, based on an LTE communication system, the interval 843 corresponding to one symbol length is 71.3 μs. The base station 801 can determine 46.3 μs excluding 25 μs of the category-2 LBT time of the first terminal 803, as the length of the interval 845 which carries the dummy reservation signal 849.

A time axis 820 represents time flow when the first terminal 803 performs signaling. Based on the time axis 820, the first terminal 803 conducts the LBT and transmits uplink data. The first terminal 803 can receive downlink data from the base station 801 in the interval 841. The first terminal 803 can receive the dummy reservation signal 849 from the base station 801 in the interval 845. The dummy reservation signal 849 is broadcast from the base station 801 to every node in the coverage area. For accurate time synchronization, the base station 801 can send the reservation signal which is shorter or longer than the time excluding the LBT time by considering propagation delay.

In the interval 847, upon receiving the dummy reservation signal 849, the first terminal 803 can perform LBT for the uplink transmission. The first terminal 803 can conduct the category-2 LBT for 25 μs. Since the LBT end timing matches the subframe boundary, the first terminal 803 can transmit uplink data to the base station 801 immediately after the LBT. By transmitting the reservation signal (e.g., the dummy reservation signal 849) until the subframe boundary, the terminal (e.g., the first terminal 803) can block another node (e.g., the second terminal 805) from occupying the channel and occupy the channel.

A time axis 830 represents time flow when the second terminal 805 performs signaling.

Figure 8B:
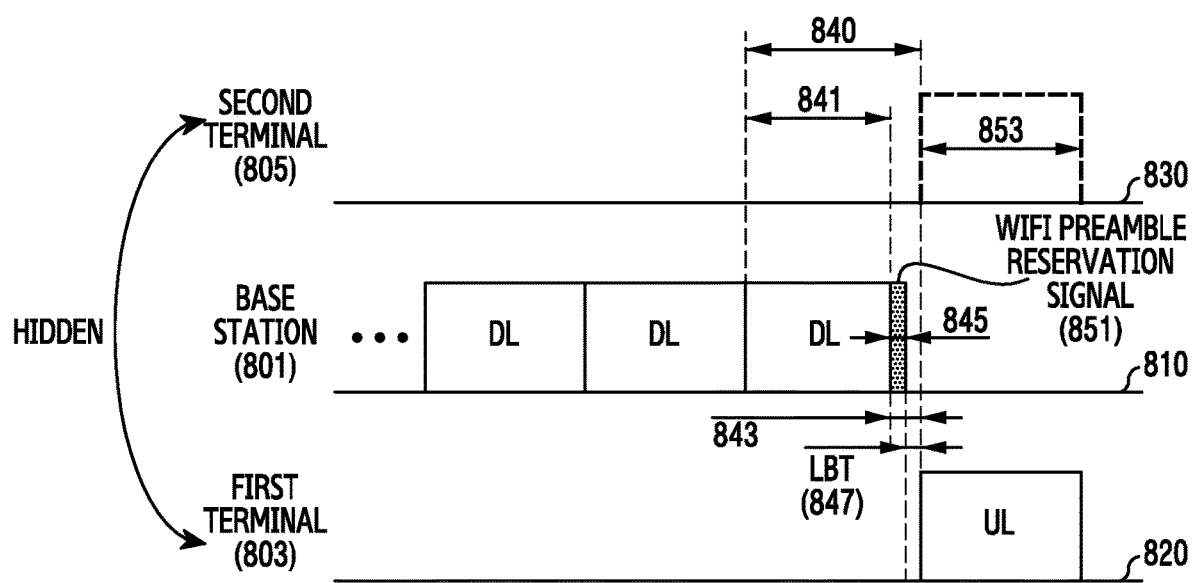

FIG. 8B illustrates a subframe for transmitting an inter-transmission reservation signal from a terminal in a wireless communication system, according to various embodiments of the present disclosure. In FIG. 8B, the same intervals as those illustrated in FIG. 8A, and the same or similar operations to the operations illustrated in FIG. 8A are omitted.

Referring to FIG. 8B, in the interval 845, the base station 801 can send a WiFi preamble reservation signal 851 instead of the dummy reservation signal 849. As stated above, the WiFi preamble can include the information about the PHY rate and the WiFi frame length. The base station 801 can broadcast the WiFi preamble reservation signal 851 to every node in the coverage area of the base station 801.

An interval 853 indicates an L-SIG protection interval of the second terminal 805. The second terminal 805 can receive the WiFi preamble reservation signal 851 from the base station 801 in the interval 845. The second terminal 805 obtains the information about the PHY rate and the WiFi frame length from the received preamble. The second terminal 805 can determine a WiFi frame duration time by dividing the WiFi frame length by the PHY rate. Herein, the determined WiFi frame duration time can correspond to the length of the interval 853. The second terminal 805 can perform the L-SIG protection for the determined WiFi frame duration time from the transmission end timing of the reservation signal from the base station 801. That is, to protect the uplink transmission between the base station 801 and the first terminal 803, the second terminal 805 does not send a signal during the interval 853 and thus can avoid inter-signal interference. As a result, the channel occupation of the first terminal 803 can be protected from another node.

Figure 9A:
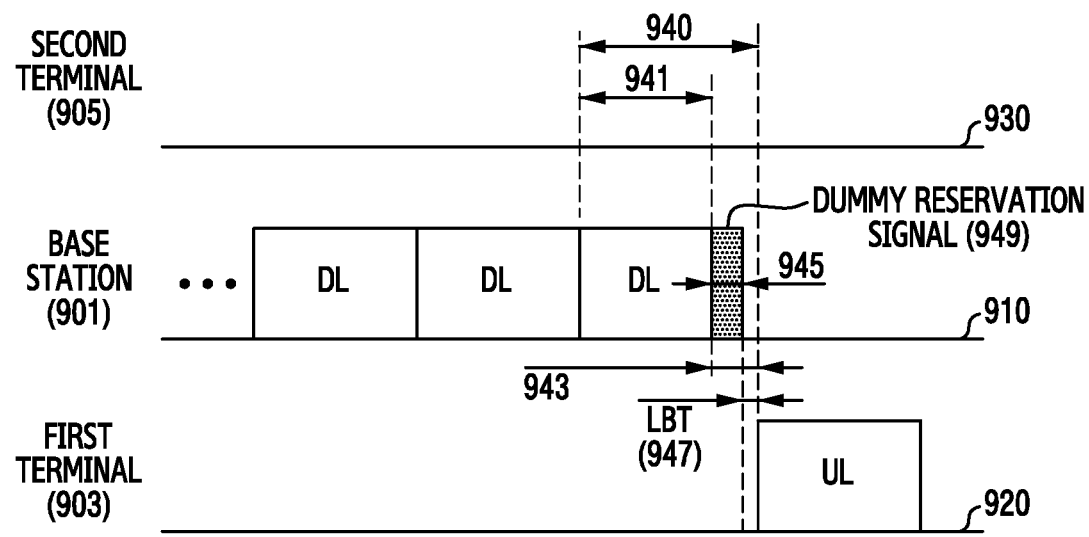
FIGS. 9A and 9B illustrate a subframe for transmitting an inter-transmission reservation signal from a base station in a wireless communication system, according to various embodiments of the present disclosure.

FIG. 9A illustrates a subframe for transmitting an inter-transmission reservation signal from a base station in a wireless communication system, according to various embodiments of the present disclosure.

Referring to FIG. 9A, a base station 901 can correspond to the base station 110, a first terminal 903 can correspond to the first terminal 120, and a second terminal 905 can correspond to the second terminal 130. The second terminal 905 indicates a neighboring node different from the first terminal 903.

A time axis 910 represents time flow in signaling from the base station 901. Based on the time axis 910, the base station 901 transmits downlink data and a reservation signal to the first terminal 903. The base station 901 can transmit the downlink data over a channel occupied by the first terminal 903. An interval 940 corresponds to a last subframe of the downlink data transmission. The last subframe of the downlink data transmission corresponding to an interval 941 can be an ending partial subframe.

In an interval 945, the base station 901 can send a dummy reservation signal 949. The base station 901, which transmits the downlink data, can determine a data transmission end timing. The base station 901 can send the dummy reservation signal 949 following the downlink data. The base station 901 can send the dummy reservation signal 949 to every node in the base station 901 coverage area in the interval 945. For accurate time synchronization, the base station 901 can send the reservation signal which is shorter or longer than the time excluding the LBT time by considering propagation delay. The dummy reservation signal 949 can notify the busy channel state to every node which senses the channel within the coverage area of the base station 901.

A time axis 920 represents time flow when the first terminal 903 performs signaling. Based on the time axis 920, the first terminal 903 conducts the LBT and transmits uplink data. The first terminal 903 can perform the LBT for the uplink transmission in an interval 947. Upon receiving the dummy reservation signal 949 from the base station 910, the first terminal 903 can perform the LBT immediately. The first terminal 903 can conduct the category-2 LBT for 25 μs. The first terminal 903 can pre-acquire the information about the last subframe type and the transmission end timing of the dummy reservation signal 949 by signaling with the base station 901. The first terminal 903 can perform the LBT at the transmission end timing of the dummy reservation signal 949.

After the base station 901 transmits the downlink data to the first terminal 903, the second terminal 905 can perform the LBT in the interval 945. The second interval 905 can receive the dummy reservation signal 949 from the base station 901 during the LBT and determine that the channel is currently occupied by another node (e.g., the first terminal 903). After a certain time passes, the second terminal 905 can execute the LBT for data transmission. As the base station 901 sends the reservation signal, the channel occupation of the first terminal 903 can be ensured.

A time axis 930 represents time flow when the second terminal 905 performs signaling.

Figure 9B:
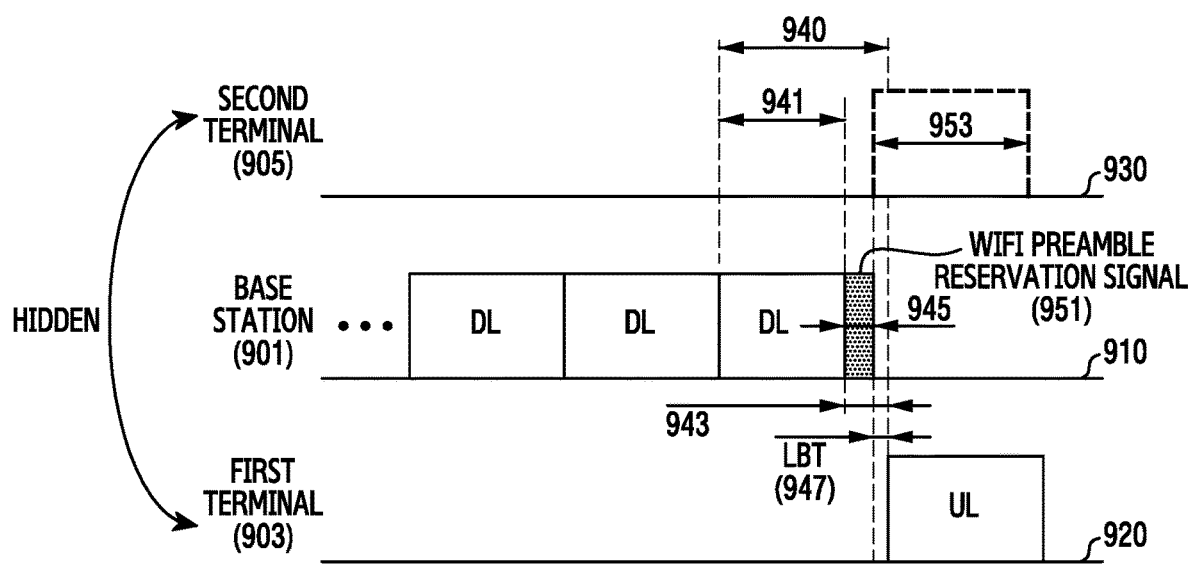

FIG. 9B illustrates a subframe for transmitting an inter-transmission reservation signal from a terminal in a wireless communication system, according to various embodiments of the present disclosure. In FIG. 9B, the same intervals as those illustrated in FIG. 9A, and the same or similar operations to the operations illustrated in FIG. 9A are omitted.

Referring to FIG. 9B, in the interval 945, the base station 901 can send a WiFi preamble reservation signal 951. As stated above, the WiFi preamble can include the information about the PHY rate and the WiFi frame length. The base station 901 can broadcast the WiFi preamble reservation signal 951 to every node in the base station 901 coverage area.

An interval 953 indicates an L-SIG protection interval of the second terminal 905. The second terminal 905 can receive the WiFi preamble reservation signal 951 from the base station 901 in the interval 945. The second terminal 905 can obtain the information about the PHY rate and the WiFi frame length from the received preamble. The second terminal 905 can determine a frame duration time by dividing the WiFi frame length by the PHY rate. The determined WiFi frame duration time can correspond to the length of the interval 953. The second terminal 905 can perform the L-SIG protection for the determined WiFi frame duration time from the transmission end timing of the WiFi reservation signal 951 from the base station 901. To protect the uplink transmission between the base station 901 and the first terminal 903, the second terminal 905 does not send a signal in the interval 953 and thus can avoid inter-signal interference. As a result, the uplink transmission between the base station 901 and the first terminal 903 can be further protected.

Figure 10A:
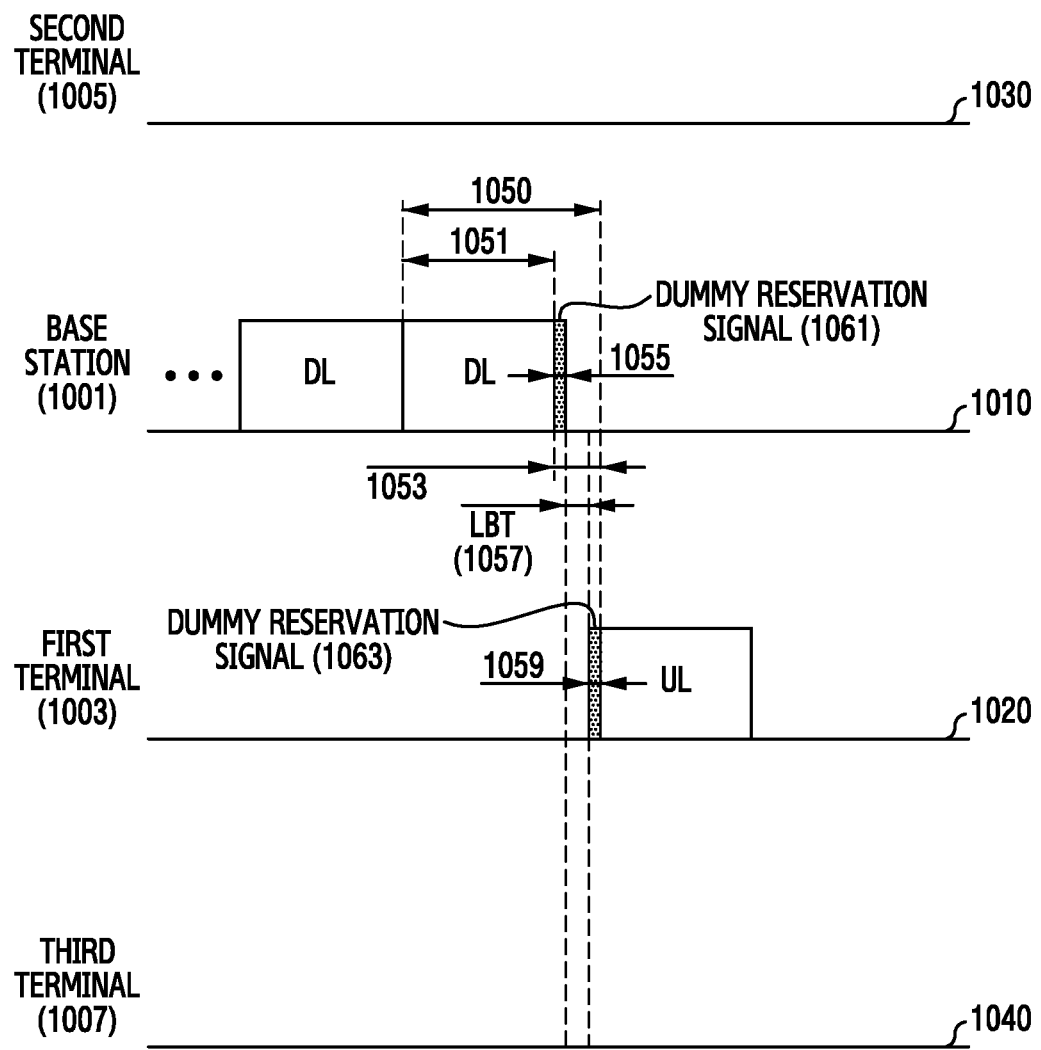
FIGS. 10A and 10B illustrate a subframe for transmitting an inter-transmission reservation signal from a base station and a terminal in a wireless communication system according to various embodiments of the present disclosure.

FIG. 10A illustrates a subframe for transmitting an inter-transmission reservation signal from a terminal in a wireless communication system, according to various embodiments of the present disclosure.

Referring to FIG. 10A, a base station 1001 can correspond to the base station 110. A first terminal 1003, a second terminal 1005, and a third terminal 1007 can correspond to the first terminal 120, the second terminal 130, and the third terminal 140, respectively.

A time axis 1010 represents time flow in signaling of the base station 1001. The base station 1001 can transmit downlink data over a channel occupied by the first terminal 1003. A last subframe of the downlink transmission corresponds to an interval 1050. An interval 1051 transmits the downlink data and can be determined by a type of the last subframe of the downlink transmission. The interval 1050 can be a full frame, and an interval 1053 can be one symbol interval in an LTE communication system. That is, the base station 1001 can transmit the downlink data by excluding one last symbol of the last subframe for the LBT of the first terminal 1003. Hence, the interval 1051 can correspond to 13 OFDM symbols.

An interval 1055 carries a dummy reservation signal 1061 from the base station 1001. For accurate time synchronization, the base station 1001 can send the reservation signal which is shorter or longer than the time excluding the LBT time by considering the propagation delay. The dummy reservation signal 1061 can be broadcast to every node in the coverage area of the base station 1001. A neighboring node (e.g., the second terminal 1005), which senses the channel, can receive the dummy reservation signal 1061 and determine that the channel is presently occupied by another node (e.g., the first terminal 1003). The interval 1055 carrying the dummy reservation signal 1061 can be determined by taking into account a length of the dummy reservation signal 1063 received from the first terminal 1003 and the LBT time of the first terminal 1003. The interval carrying the dummy reservation signal 1061, an LBT interval 1057, and the interval carrying the dummy reservation signal 1063 can be included in one symbol. The base station 1001 can have the flexibility to send the reservation signal within the time of 46.3 µs by excluding the LBT time 25 µs of the first terminal 1003 from 71.3 µs corresponding to one symbol. The reservation signal transmission of the base station 1001 for up to 46.7 µs is illustrated in FIG. 8, and the reservation signal transmission of the base station 1001 for 0 µs, that is, no reservation signal transmission is illustrated in FIG. 5 and FIG. 6. In FIG. 10, both of the base station 1001 and the first terminal 1003 send the reservation signal. The base station 1001 can send the dummy reservation signal 1061 having a certain interval not exceeding 46.3 µs.

A time axis 1020 represents time flow when the first terminal 1003 performs signaling. Based on the time axis 1020, the first terminal 1003 receives downlink data and a reservation signal from the base station 1001, performs the LBT, and sends a dummy reservation signal. In the following, for ease of understanding, the dummy reservation signal 1061 transmitted from the base station 1001 is referred to as a first reservation signal, and the dummy reservation signal 1063 transmitted from the first terminal 1003 is referred to as a second reservation signal. Upon receiving the first reservation signal from the base station 1001, the first terminal 1003 can conduct the LBT. The first terminal 1003 can execute the LBT for uplink transmission in the interval 1057. To block another node from occupying the channel, the first terminal 1003 can carry out the LBT directly upon receiving the first reservation signal.

The first terminal 1003 can send the second reservation signal in an interval 1059. That is, after the LBT, the first terminal 1003 can send the dummy reservation signal 1063 until the subframe boundary. The first terminal 1003 can send the second reservation signal to every node in the first terminal 1003 coverage area. Every node in the coverage area, receiving the second reservation signal, can determine that the channel is currently occupied by another node (e.g., the first terminal 1003). Next, the first terminal 1003 can transmit uplink data based on the subframe boundary.

A time axis 1030 and a time axis 1040 represent time flow of the second terminal 1005 and the third terminal 1007, respectively. More specifically, the second terminal 1005 travels in the coverage area of the base station 1001 but can indicate any node outside the coverage area of the first terminal 1003. The third terminal 1007 travels outside the coverage area of the base station 1001 but can indicate any node inside the coverage area of the first terminal 1003.

The second terminal 1005 can receive the first reservation signal from the base station 1001. Based on the first reservation signal, the second terminal 1005 can determine that the channel is occupied by another node. After a certain time passes, the second terminal 1005 can perform the LBT for data transmission. The third terminal 1007 can receive the second reservation signal from the first terminal 1003. The third terminal 1007 can determine that the channel is occupied by another node, and after a certain time passes, perform the LBT for data transmission.

Figure 10B:
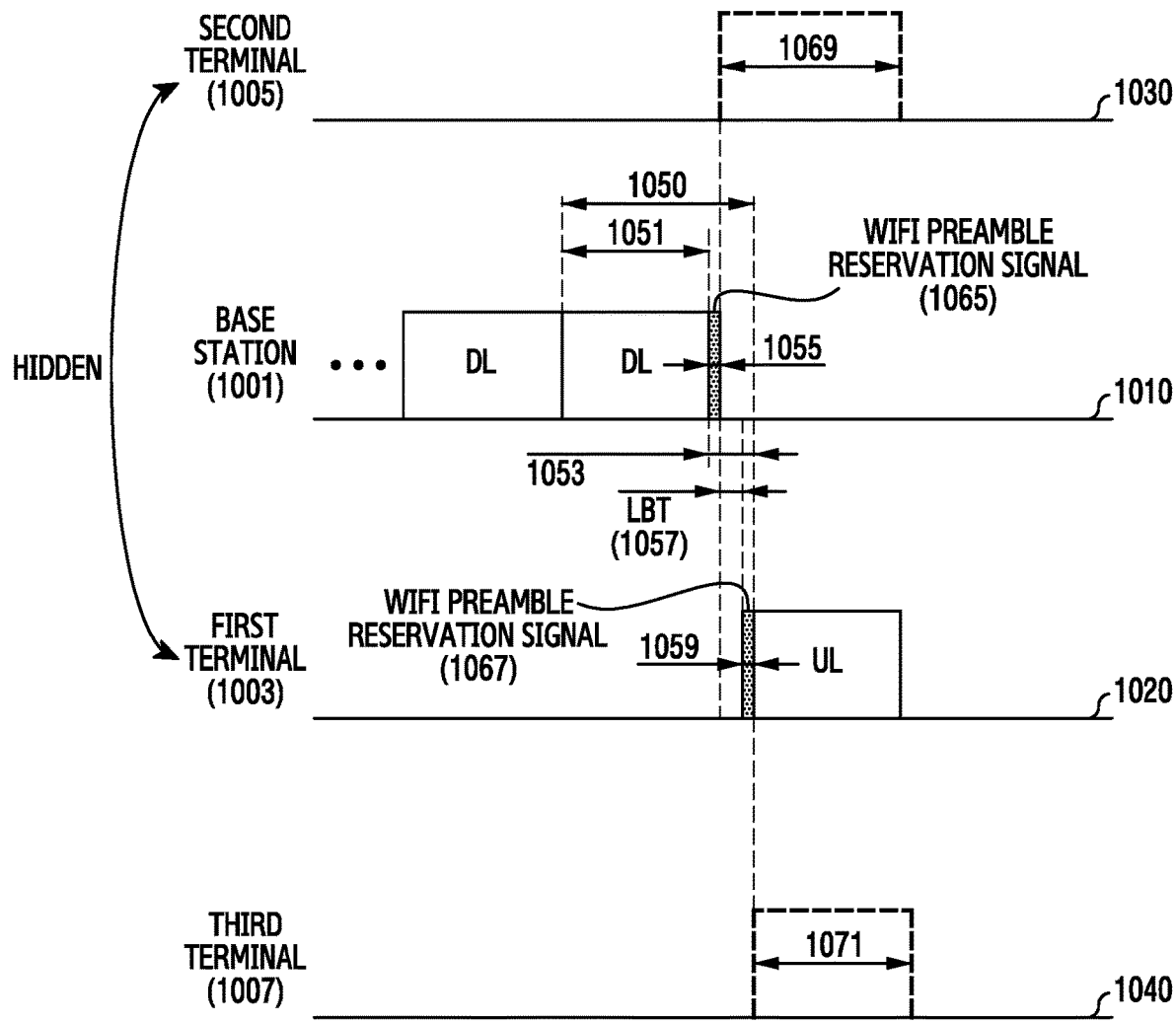

FIG. 10B illustrates a subframe for transmitting an inter-transmission reservation signal from a terminal in a wireless communication system, according to various embodiments of the present disclosure. In FIG. 10B, the same intervals as those illustrated in FIG. 10A, and the same or similar operations to the operations illustrated in FIG. 10A are omitted.

In the interval 1055, the base station 1001 can send a WiFi preamble reservation signal 1065. As stated above, the WiFi preamble which is transmitted as the reservation signal can include the information about the PHY rate and the WiFi frame length. The second terminal 1005 in the coverage area of the base station 1001, receiving the WiFi preamble reservation signal 1065, can determine that the channel is not idle. When the second terminal 1005 is a WiFi device, the second terminal 1005 can predict a WiFi frame transmission end timing based on the information contained in the preamble. Hence, the second terminal 1005 can perform the L-SIG protection until the frame transmission end timing. The third terminal 1007, which travels outside the coverage area of the base station 1001, may not receive the WiFi preamble reservation signal 1065.

In an interval 1059, the first terminal 1003 sends a WiFi preamble reservation signal 1067. The first terminal 1003 can broadcast the WiFi preamble reservation signal 1067 including the PHY rate and WiFi frame length information, to every node in the first terminal 1003 coverage area. The third terminal 1007 cannot receive the WiFi preamble reservation signal 1065 from the base station 1001 but can receive the WiFi preamble reservation signal 1067 from the first terminal 1003. The third terminal 1007 can conduct the L-SIG protection based on the information contained in the received preamble.

As such, the base station 1001 or the first terminal 1003 sends the individual reservation signal, thus avoiding an uplink transmission failure caused by a node outside the coverage area.

Figure 11A:
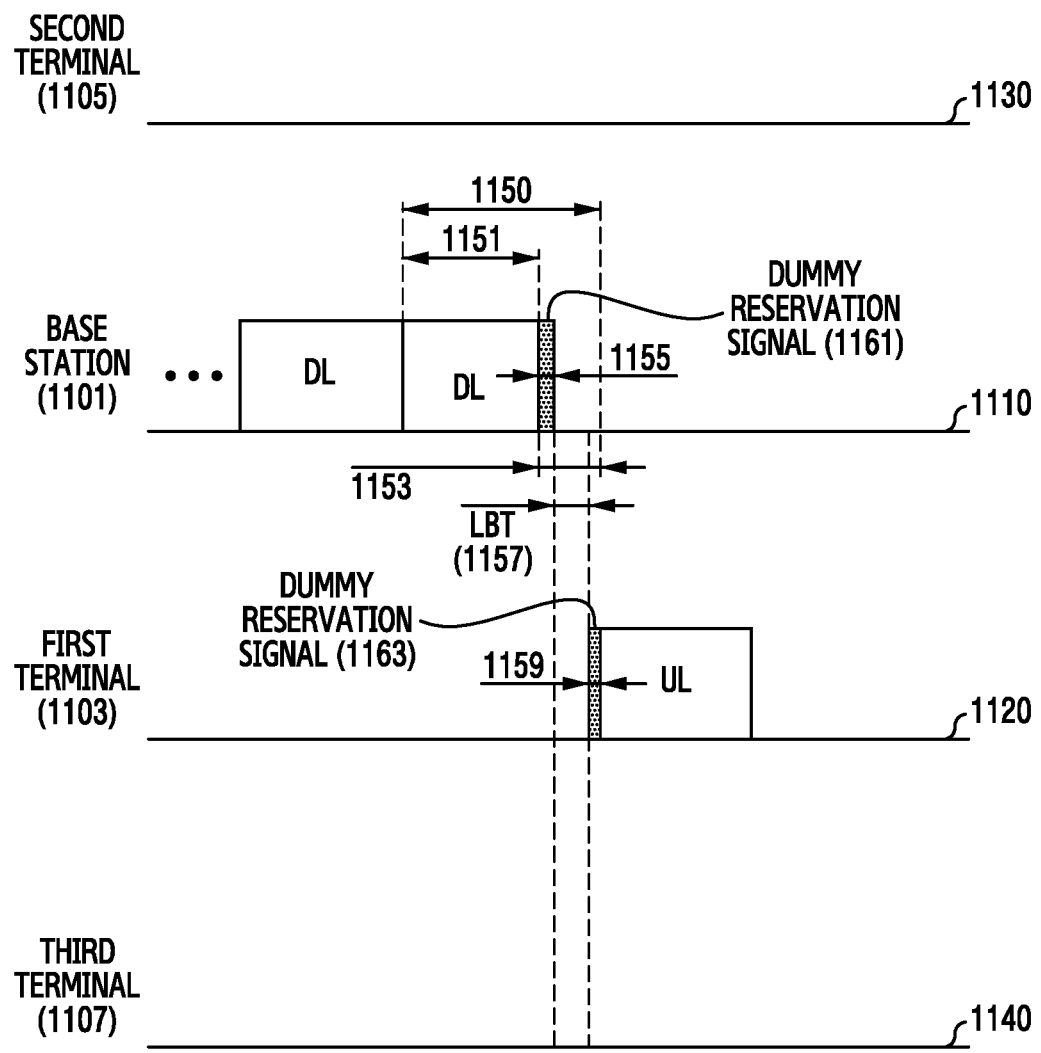
FIGS. 11A and 11B illustrate a subframe for transmitting an inter-transmission reservation signal from a base station and a terminal in a wireless communication system, according to various embodiments of the present disclosure.
Figure 12:
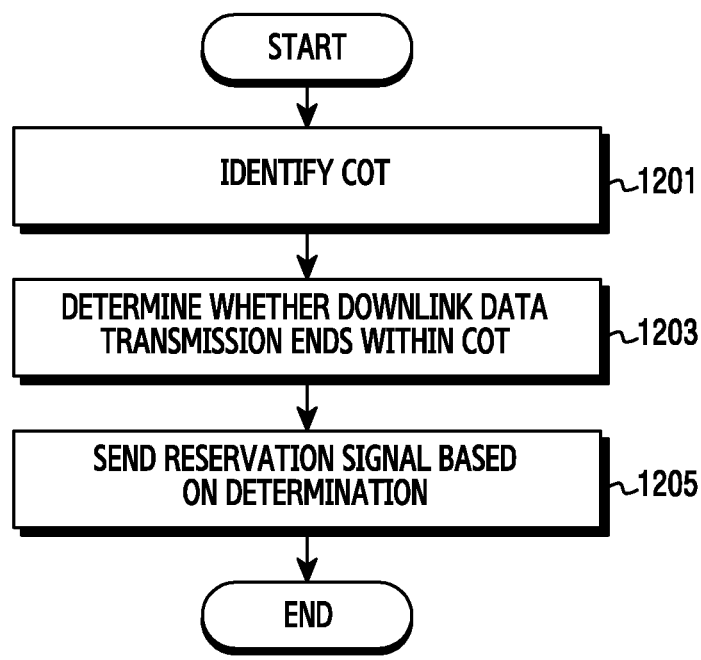
FIG. 12 is a flowchart of operations of a base station for occupying a channel in a wireless communication system, according to various embodiments of the present disclosure.

FIG. 11A illustrates a subframe for transmitting an inter-transmission reservation signal from a terminal in a wireless communication system, according to various embodiments of the present disclosure.

Referring to FIG. 11A, a base station 1101 can correspond to the base station 110. A first terminal 1103, a second terminal 1105, and a third terminal 1107 can correspond to the first terminal 120, the second terminal 130, and the third terminal 140, respectively.

A time axis 1110 represents time flow in signaling from the base station 1101. Based on the time axis 1110, the base station 1101 transmits downlink data to the first terminal 1103 and receives uplink data.

A time axis 1120 represents time flow when the first terminal 1103 performs signaling. A time axis 1130 represents time flow when the second terminal 1105 performs signaling. A time axis 1140 represents time flow when the third terminal 1107 performs signaling.

An interval 1151 delivers downlink data in a last subframe of the downlink transmission. The interval 1151 corresponds to the downlink data transmission interval according to the ending partial subframe, and an interval 1153 is longer than one symbol length based on an LTE communication system.

In an interval 1155, the base station 1101 sends a dummy reservation signal 1161. The base station 1101 sends the dummy reservation signal 1161 to every node in the coverage area of the base station 1101. A neighboring node can determine that the channel is not idle. The second terminal 1105 can receive the dummy reservation signal 1161 from the base station 1101, but the third terminal 1107 outside the coverage area may not receive the reservation signal from the base station 1101.

The first terminal 1103 can execute the LBT for uplink transmission in the interval 1157.

In an interval 1159, the first terminal 1103 sends a dummy reservation signal 1163. The first terminal 1103 sends the reservation signal to every node in the coverage area of the first terminal 1103. A node near the coverage area can determine that the channel is not idle. The third terminal 1107 can receive the reservation signal from the first terminal 1103, but the second terminal 1105 outside the coverage area of the first terminal 1103 may not receive the reservation signal from the first terminal 1103.

As above, the base station 1101 and the first terminal 1103 individually send the reservation signal so as to notify the busy channel state to the node outside their coverage area. Thus, the reservation signal transmitted can ensure the channel occupation of the first terminal for the uplink transmission.

Figure 11B:
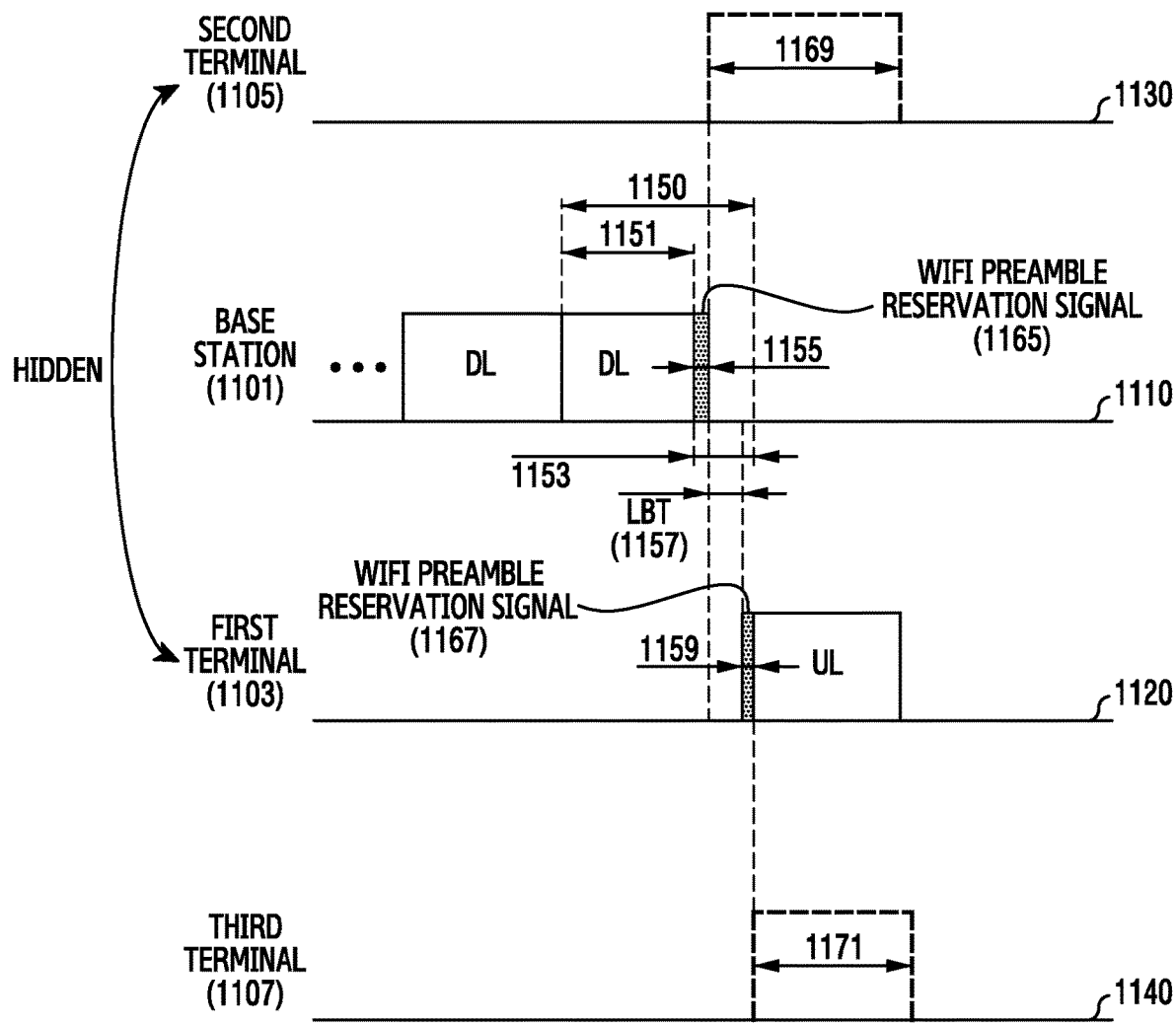

FIG. 11B illustrates a subframe for transmitting an inter-transmission reservation signal from a terminal in a wireless communication system, according to various embodiments of the present disclosure. In FIG. 11B, the same intervals as those illustrated in FIG. 11A and the same or similar operations to the operations illustrated in FIG. 11A are omitted.

Referring to FIG. 11B, in the interval 1155, the base station 1101 sends a WiFi preamble reservation signal 1165. Every node in the coverage area of the base station 1101 receives the WiFi preamble reservation signal 1165 and thus determines that the channel is currently occupied by another node. After a certain time elapses, neighboring nodes can perform the LBT for data transmission. A WiFi node in the coverage area of the base station 1101 can predict a frame end timing based on the information contained in the preamble and conduct the L-SIG protection.

In an interval 1159, the first terminal 1103 can send a WiFi preamble reservation signal 1167. That is, the first terminal 1103 can broadcast the WiFi preamble reservation signal 1167 including the PHY rate and WiFi frame length information, to every node in the coverage area of the first terminal 1103. The third terminal 1107 outside the coverage area of the base station 1101 does not receive the reservation signal from the base station 1101 but receives a signal from the first terminal 1103. The third terminal 1107 can predict a frame end timing based on the information contained in the received preamble and conduct the L-SIG protection. Hence, the base station 1101 and the first terminal 1103 individually send the reservation signal and can thus prevent the channel occupation of a node outside the coverage area. In addition, signal transmission can be suppressed according to the L-SIG protection and the transmission over the channel can be further protected.

In FIG. 4 through FIG. 11, the reservation signal transmission before or after the LBT for the channel occupation between the downlink transmission and the uplink transmission has been illustrated. While the reservation signal is transmitted at the downlink transmission end timing or the LBT end timing, the terminal can determine when to send the reservation signal through separate signaling before the data transmission (e.g., downlink transmission). By receiving information (e.g., an uplink subframe location, a downlink subframe location after a maximum COT, or a downlink transmission end timing) in advance or receiving type information of a reservation signal to be used, the terminal can acquire information about whether the reservation signal is transmitted or not and, if transmitted, when the reservation signal is transmitted.

Intra-Transmission Channel Occupation

FIG. 12 illustrates operations of a base station for occupying a channel in a wireless communication system, according to various embodiments of the present disclosure;

Referring to FIG. 12, in step 1201, the base station 110 identifies a COT. LTE-LAA standard defines the COT for the fairness with other communication systems. For example, the maximum COT based on the LBT can be 2 ms, 3 ms, 5 ms, 8 ms, or 10 ms. The base station 110 can identify a downlink COT.

In step 1203, the base station 110 can determine whether downlink data transmission ends within the COT. That is, the base station 110 determines whether the downlink data transmission ends within the COT in order to determine whether to send a reservation signal. When the downlink data transmission ends within the COT, the base station 110 can finish this process. By contrast, when not finishing the downlink data transmission within the COT, the base station 110 needs to send a reservation signal to occupy the channel for next downlink transmission. Hence, the base station 110 can compare the COT with the downlink data transmission end timing.

In step 1205, the base station 110 can send a reservation signal based on the determination. When the downlink data transmission does not end within the COT, the base station 110 sends the reservation signal in order to protect the base station 110 channel occupation for the next downlink transmission. The reservation signal can be a dummy signal. The reservation signal can be a WiFi preamble. The reservation signal can include any signal from a neighboring node for detecting the channel occupation of the base station 110 through the channel sensing.

The base station 110 occupies the channel by transmitting the intra-transmission reservation signal and thus can reduce a channel occupation probability of the neighboring node. By blocking the neighboring node from occupying the channel, the base station 110 can sustain the downlink transmission.

Figure 13A:
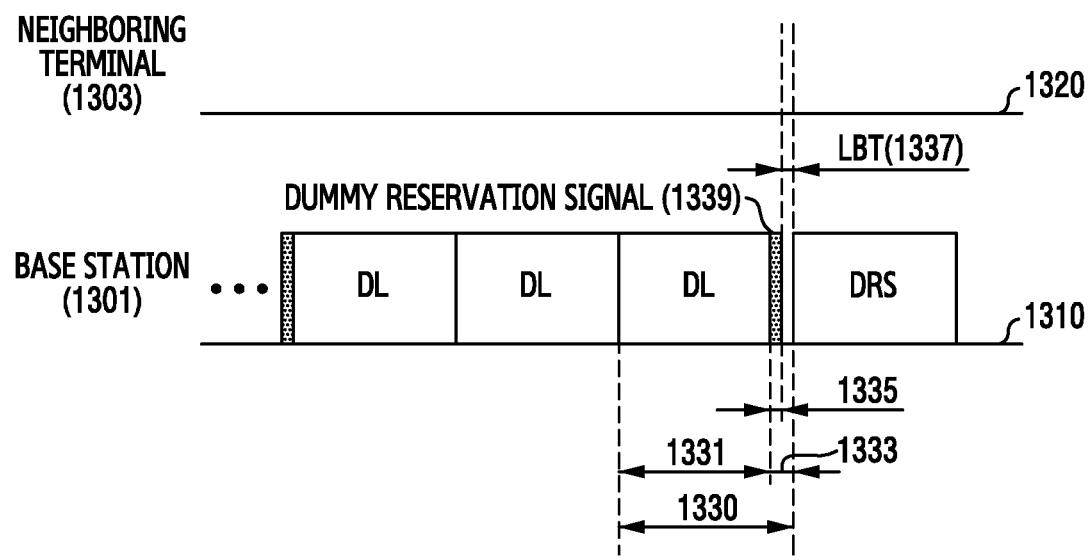
FIGS. 13A and 13B illustrate a subframe for transmitting an intra-transmission reservation signal in a wireless communication system, according to various embodiments of the present disclosure.

FIG. 13A illustrates a subframe for transmitting an intra-transmission reservation signal from a base station in a wireless communication system, according to various embodiments of the present disclosure.

Referring to FIG. 13A, a base station 1301 can correspond to the base station 110, and a neighboring terminal 1303 can correspond to the first terminal 120, the second terminal 130, or the third terminal 140.

A time axis 1310 represents time flow in signaling from the base station 1301. Based on the time axis 1310, the base station 1301 transmits downlink data and a reservation signal.

An interval 1330 indicates a last subframe in a COT. The base station 1301 requires a LBT time of 25 μs to occupy the channel for downlink transmission. Hence, the base station 1301 may not transmit the downlink data until a subframe boundary of the interval 1330. Lengths of an interval 1331 carrying the downlink data of the base station 1301 and an interval 1333 from the downlink data end timing to the subframe boundary can differ depending on a type of the last subframe of the COT. When the last subframe is a full subframe, the downlink data transmission can end one OFDM symbol earlier than the downlink subframe boundary. In this case, the interval 1333 can have the time length 71.3 μs corresponding to the one OFDM symbol length.

In an interval 1335, the base station 1301 can send a dummy reservation signal 1339. Specifically, the base station 1301, which transmits the downlink data, can determine the accurate end timing of the interval 1331 and thus send the dummy reservation signal 1339 immediately after the downlink data transmission ends. The dummy reservation signal 1339 is broadcast to nodes in coverage area of the base station 1301, thus notifying that the channel is not idle.

In an interval 1337, the base station 1301 performs LBT. The base station 1301, which does not transmit all the downlink data before the end of the COT, can conduct the LBT for the next downlink transmission after channel occupation release. For example, the base station 1301 can perform the category-2 LBT for 25 μs.

A time axis 1320 represents time flow of the neighboring node 1303. Specifically, based on the time axis 1320, the neighboring node 1303 fails in the channel occupation for the downlink transmission of the neighboring node 1303.

The neighboring node 1303 can perform the LBT to transmit data. In the LBT while the base station 1301 transmits the downlink data, the neighboring node 1303 can detect energy that is over a threshold. Thus, the neighboring node 1303 can determine that another node (e.g., the base station 1301) occupies the channel.

The neighboring node 1303 may perform the LBT in the interval 1333 ranging from the downlink data transmission end timing of the base station 1301 to the subframe boundary. Herein, the interval 1333 can include an interval 1335 and an interval 1337. When conducting the LBT in the interval 1335, the neighboring node 1303 can receive the dummy reservation signal 1339 from the base station 1301 and thus determine no idle channel state. That is, the neighboring node 1303 can determine the channel occupation by another node (e.g., the base station 1301).

In the interval 1337, the neighboring node 1303 can execute the LBT at least for the shortest time (e.g., 25 μs). In so doing, the neighboring node 1303, which is different from the base station 1301, cannot determine the accurate transmission time and, even if conducting the LBT for 25 μs, can detect the energy over the threshold due to time delay caused by a physical distance between the base station 1301 and the neighboring node 1303. That is, the neighboring node 1303 cannot occupy the channel on account of the reservation signal or the downlink (e.g., discovery reference signal (DRS)) transmission from the base station 1301.

As above, as the base station 1301 sends the reservation signal, the neighboring node 1303 which is located near the base station 1301 is less likely to occupy the channel during the downlink transmission of the base station 1301. The channel occupation for the downlink transmission of the base station 1301 can be ensured.

Figure 13B:
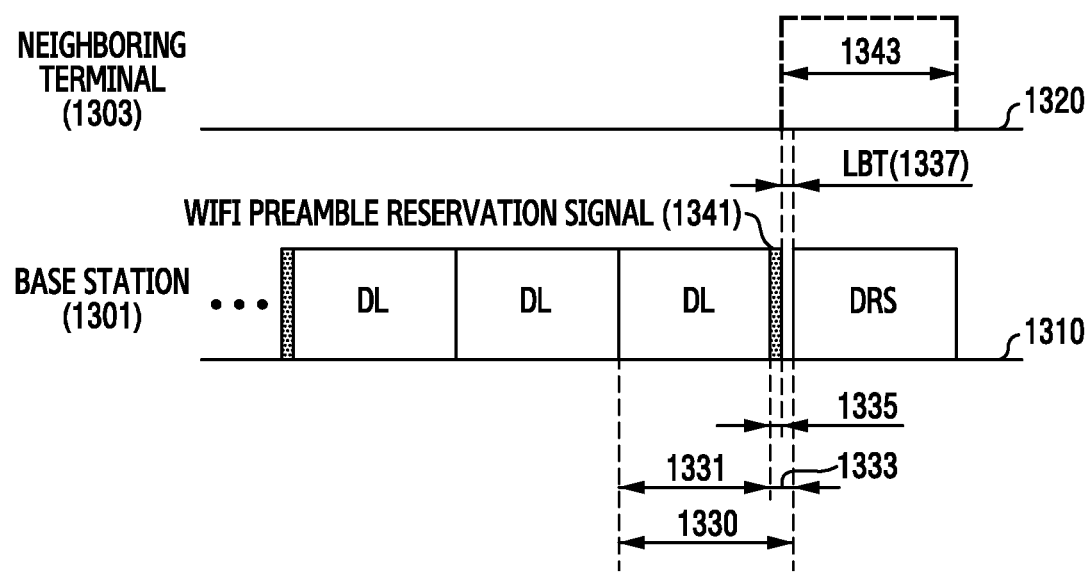

FIG. 13B illustrates a subframe for transmitting an intra-transmission reservation signal of a terminal in a wireless communication system, according to various embodiments of the present disclosure. In FIG. 13B, the same intervals as those illustrated in FIG. 13A, and the same or similar operations to the operations illustrated in FIG. 13A are omitted.

Referring to FIG. 13B, in the interval 1335, the base station 1301 sends a WiFi preamble reservation signal 1341. The neighboring node 1303 receives the WiFi preamble reservation signal 1341 from the base station 1301 during the LBT for downlink channel occupation, determines no idle channel, and waits for next LBT. As mentioned above, the WiFi preamble which is transmitted as the reservation signal includes the information about the PHY rate and the WiFi frame length. Accordingly, the neighboring node 1303 predicts a current WiFi frame end timing based on the information of the received preamble and performs the L-SIG protection until a corresponding timing. That is, to protect the downlink transmission of the base station 1301, the neighboring node 1303 avoids interference by not transmitting a signal in the interval 1343 until the calculated WiFi frame end timing. Thus, by transmitting the intra-transmission reservation signal, the base station 1301 can block the channel occupation of the neighboring node and guarantee the channel occupation of base station 1301 for the downlink transmission, and the L-SIG protection of the neighboring node 1303 can protect up to the downlink transmission after the channel occupation.

Figure 14A:
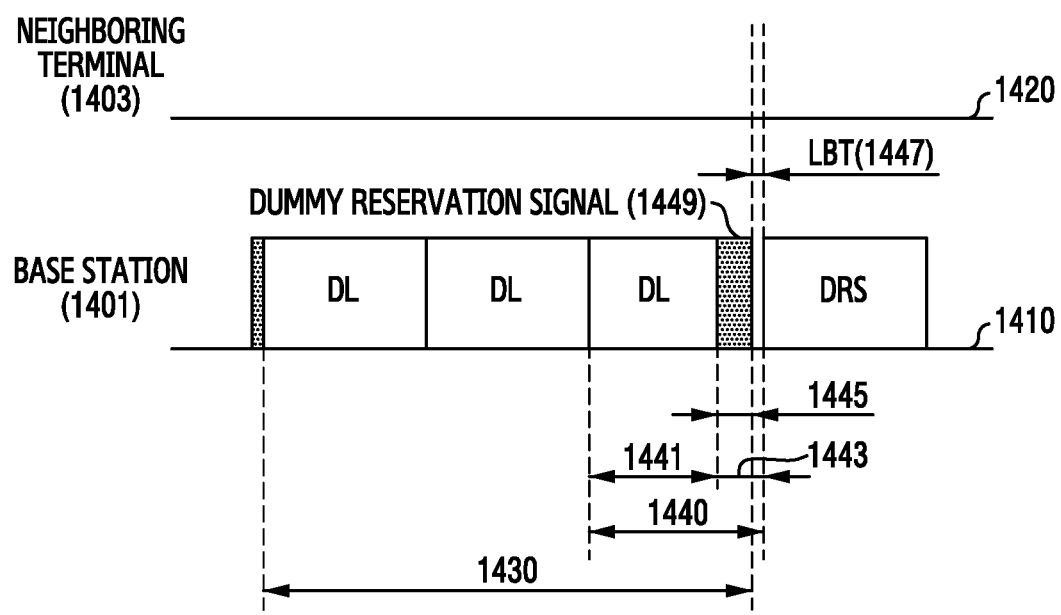
FIGS. 14A and 14B illustrate a subframe for transmitting an intra-transmission reservation signal in a wireless communication system, according to various embodiments of the present disclosure.

FIG. 14A illustrates a subframe for transmitting an intra-transmission reservation signal from a base station in a wireless communication system according to various embodiments of the present disclosure.

Referring to FIG. 14A, a base station 1401 can correspond to the base station 110, and a neighboring terminal 1403 can include the first terminal 120, the second terminal 130, or the third terminal 140. In FIG. 14A, the same intervals as those illustrated in FIG. 13A, and the same or similar operations to the operations illustrated in FIG. 13A are omitted.

A time axis 1410 represents time flow in signaling of the base station 1401. Based on the time axis 1410, the base station 1401 transmits downlink data and a reservation signal.

In an interval 1430, the base station 1401 transmits downlink data and a reservation signal 1449.

An interval 1441 delivers downlink data in a last subframe of a COT. The base station 1401 requires LBT time of 25 μs to occupy the channel for downlink transmission. Hence, the base station 1401 may not transmit the downlink data until a subframe boundary of an interval 1440. That is, the subframe boundary may not match the downlink data transmission end timing. Lengths of an interval 1441 carrying the downlink data of the base station 1401 and an interval 1443 from the downlink data end timing to the subframe boundary can differ depending on a type of the last subframe of the COT.

When the last subframe is an ending partial subframe, the downlink data transmission interval can be much shorter, compared to the last subframe which is a full subframe. That is, the interval 1443 can be longer than one OFDM symbol length, that is, greater than 71.3 μs. Hence, to occupy the channel for the downlink transmission of the base station 1401, an interval for carrying a dummy reservation signal 1449 can increase in length.

The neighboring terminal 1403 can execute the LBT for uplink transmission in the interval 1447.

A time axis 1420 represents time flow in signaling of the neighboring terminal 1403.

Figure 14B:
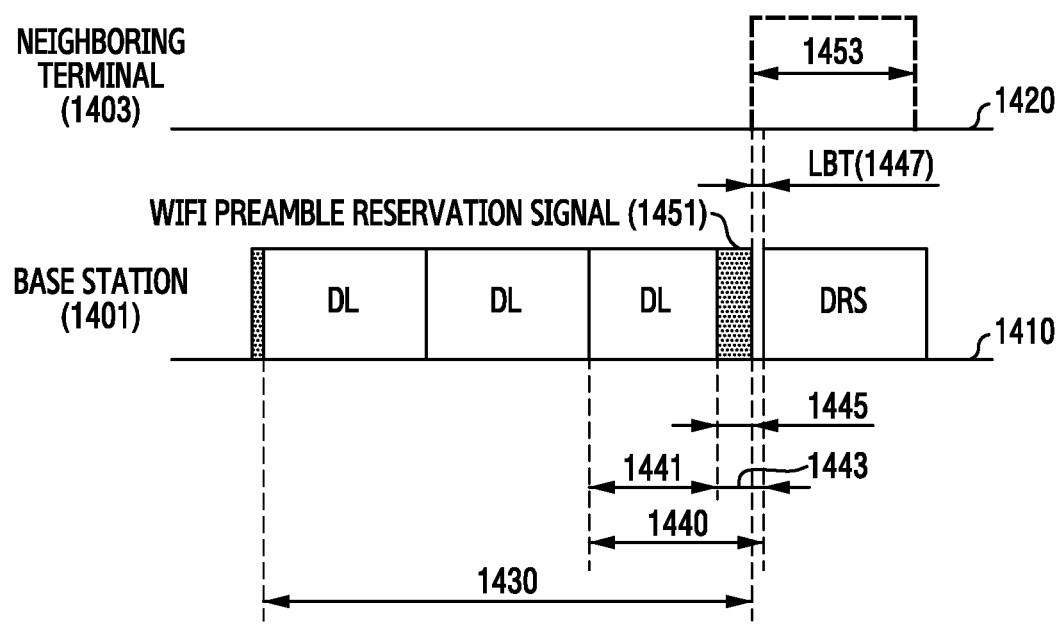

FIG. 14B illustrates a subframe for transmitting an intra-transmission reservation signal from a base station in a wireless communication system according to various embodiments of the present disclosure. In FIG. 14B, the same intervals as those in FIG. 13B and the same or similar operations to the operations of FIG. 13B are omitted.

Referring to FIG. 14B, in an interval 1445, the base station 1401 sends a WiFi preamble reservation signal 1451. The base station 1401 can broadcast the WiFi preamble reservation signal 1451 to the neighboring terminal 1403 in the base station 1401 coverage area. The neighboring terminal 1403 receiving the preamble acquires the information of the PHY rate and the frame length. The neighboring terminal 1403 can predict a WiFi frame end timing by dividing the WiFi frame length by the PHY rate, and perform the L-SIG protection until the predicted time. The L-SIG protection interval of the neighboring terminal 1403 is an interval 1453. That is, to protect the downlink transmission of the base station 1401, the neighboring terminal 1403 does not send a signal in the interval 1453 until the calculated WiFi frame end timing, thus avoiding interference. Hence, by transmitting the intra-transmission reservation signal including the WiFi preamble, the base station 1401 can block the channel occupation of the neighboring node and guarantee channel occupation for the downlink transmission. The L-SIG protection of the neighboring node 1403 can protect up to the downlink transmission after the channel occupation.

Figure 15:
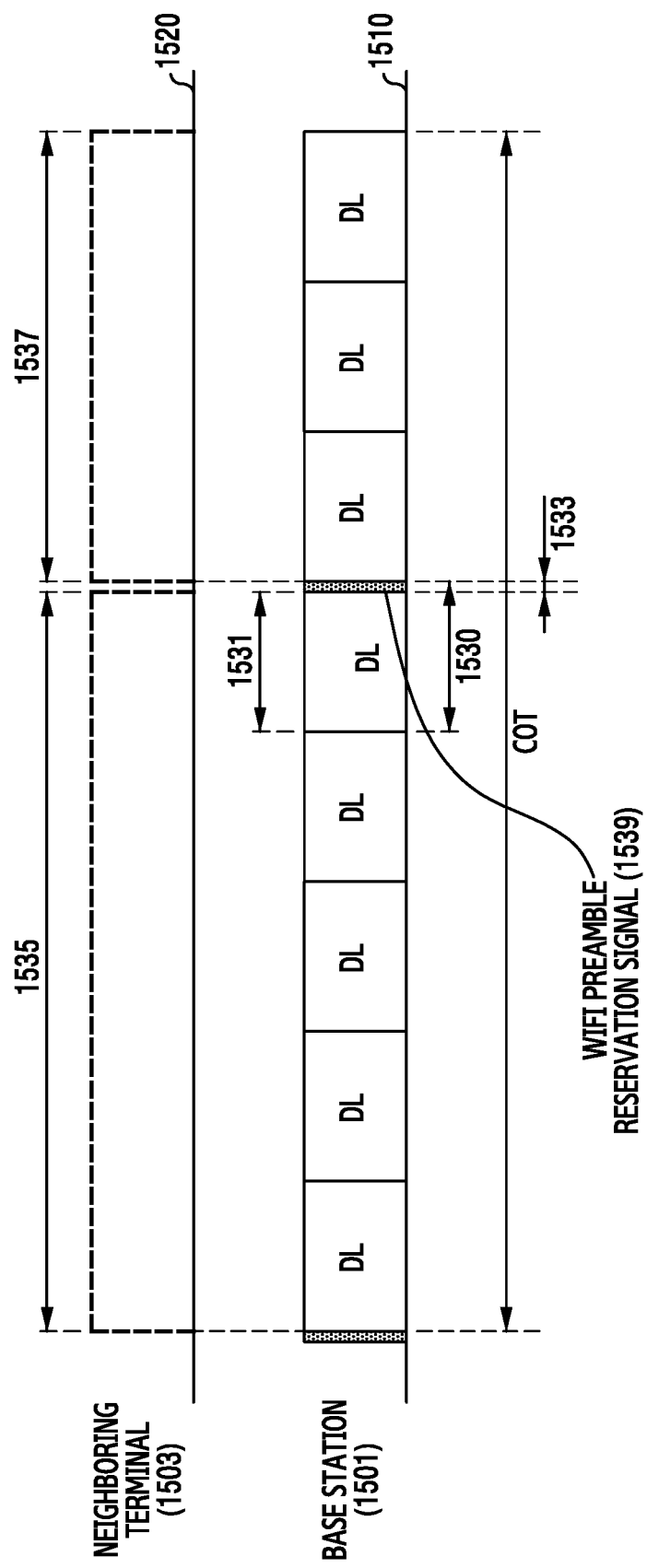
FIG. 15 illustrates a subframe for transmitting an intra-transmission reservation signal in a wireless communication system, according to various embodiments of the present disclosure.

FIG. 15 illustrates a subframe for transmitting an intra-transmission reservation signal from a base station in a wireless communication system, according to various embodiments of the present disclosure.

Referring to FIG. 15, a base station 1501 can correspond to the base station 110, and a neighboring terminal 1503 can include the first terminal 120, the second terminal 130, or the third terminal 140.

A time axis 1510 represents time flow in signaling from the base station 1501. Based on the time axis 1510, the base station 1501 transmits downlink data and a reservation signal. Specifically, when initiating the downlink transmission, the base station 1501 sends a WiFi preamble at the head of the frame to protect channel occupation from a WiFi device. The preamble transmitted at the head of the frame includes information about the PHY rate and the frame length. A neighboring WiFi node receives the preamble and acquires the PHY rate and WiFi frame length information. Hence, the neighboring WiFi node can predict a frame transmission end timing based on the acquired information. The frame transmission end timing can be calculated by dividing the WiFi frame length by the PHY rate. In a WiFi communication system, the WiFi preamble transmitted at the head of the frame can protect the transmission time up to 5.484 ms. An interval 1535 indicates an L-SIG protection interval protected by the preamble transmitted at the head of the frame.

According to the LTE-LAA standard, when the channel is occupied through the LBT, the maximum COT is 2 ms, 3 ms, 5 ms, 8 ms, or 10 ms. When the maximum COT is 8 ms or 10 ms, the downlink transmission after the L-SIG protection interval cannot be protected. Hence, the base station 1501 sends a WiFi preamble reservation signal 1539 in the interval 1533. More specifically, the base station 1501 can broadcast the WiFi preamble reservation signal 1539 to every node in the coverage area of the base station 1501. The base station 1501 performs the LBT for the successive downlink channel occupation. To obtain the LBT time of 25 µs, the base station 1501 transmits downlink data by excluding the last OFDM symbol from the subframe where the protection interval ends. The downlink data transmission including the last OFDM symbol corresponds to an interval 1530. The downlink data transmission excluding the last OFDM symbol corresponds to an interval 1530. The base station 1501 can send the WiFi preamble reservation signal 1539 in the interval 1533 corresponding to one OFDM symbol. Since the one OFDM symbol length is 71.3 µs, the base station 1501 can keep transmitting a reservation signal in the interval 1533 in order to block another node from occupying the consecutive downlink channel.

A WiFi node among neighboring nodes can predict a frame end timing based on the preamble of the reservation signal, perform the L-SIG protection, and thus protect the successive downlink transmission. An interval 1537 is an L-SIG protection interval based on a preamble of the intra-transmission reservation signal. Other neighboring nodes than the WiFi node can determine no channel is idle based on the reservation signal delivered in the interval 1533 and wait for next LBT. That is, the base station 1501 can send the reservation signal in one OFDM interval during the downlink transmission and thus ensure the occupation of the consecutive downlink. Also, the base station 1501 can send the reservation signal including the WiFi preamble and thus further protect an interval after the successive downlink occupation through the L-SIG protection.

So far, the channel occupation using the intra-transmission reservation signal has been illustrated with FIG. 12 through FIG. 15. FIGS. 12 through 15 illustrate, but are not limited to, the reservation signal transmitted in the downlink transmission. That is, the terminal can occupy the channel in the uplink transmission by transmitting the reservation signal in the uplink transmission.

According to various embodiments of the present disclosure, methods stated in claims and/or specifications of the present disclosure may be implemented in hardware, software, or a combination of hardware and software.

When the methods are implemented by software, a computer-readable storage medium for storing one or more programs (e.g., software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (e.g., software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), other type optical storage devices, or a magnetic cassette. Alternatively, any combination of some or all of the aforementioned may form a memory in which the program is stored. Further, a plurality of such memories may be included in the electronic device.

In addition, the programs may be stored in an attachable storage device which is accessible through communication networks such as the Internet, intranet, LAN, wide area network (WAN), storage area network (SAN), or a combination thereof. Such a storage device may access the electronic device via an external port. Further, a separate storage device on the communication network may access a portable electronic device.

According to various embodiments of the present disclosure, a component included in the present disclosure is expressed in the singular or the plural forms according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. A method performed by a terminal in a wireless communication system, the method comprising:
   receiving downlink data from a base station;
   detecting a first reservation signal in a subframe;
   performing a listen-before-talk (LBT) in the subframe after detecting the first reservation signal;
   transmitting a second reservation signal in the subframe based on an end timing of the LBT and a subframe boundary of a next subframe; and
   transmitting uplink data to the base station based on the subframe boundary,
   wherein the first reservation signal, the LBT, and the second reservation signal are transmitted in one symbol interval.

2. The method of claim 1, wherein the subframe is a full subframe or an ending partial subframe.

3. The method of claim 1, wherein the second reservation signal comprises a dummy signal or a wireless fidelity (WiFi) preamble, and
   wherein the WiFi preamble contains information about a physical layer (PHY) rate and a frame length.

4. The method of claim 1, wherein the second reservation signal is transmitted in an interval ranging from the LBT end timing to the subframe boundary.

5. The method of claim 1, wherein the first reservation signal comprises a dummy signal or a WiFi preamble.

6. The method of claim 1, wherein the first reservation signal is transmitted from the base station directly after transmission of the downlink data ends, and
   the LBT is conducted after the first reservation signal is received.

7. A terminal in a wireless communication system, the terminal comprising:
   a transceiver; and
   at least one processor, operably coupled to the transceiver, configured to:
   receive downlink data from a base station,
   detect a first reservation signal in a subframe,
   perform a listen-before-talk (LBT) in the subframe after detecting the first reservation signal,
   transmit a second reservation signal in the subframe based on an end timing of the LBT and a subframe boundary of a next subframe, and
   transmit uplink data to the base station based on the subframe boundary,
   wherein the first reservation signal, the LBT, and the second reservation signal are transmitted in one symbol interval.

8. The terminal of claim 7, wherein the subframe containing the subframe boundary is a full subframe or an ending partial subframe.

9. The terminal of claim 7, wherein the second reservation signal comprises a dummy signal or a wireless fidelity (WiFi) preamble, and
   wherein the WiFi preamble contains information about a physical layer (PHY) rate and a frame length.

10. The terminal of claim 7, wherein the second reservation signal is transmitted in an interval ranging from the LBT end timing to the subframe boundary.

11. The terminal of claim 7, wherein the first reservation signal comprises a dummy signal or a WiFi preamble.

12. The terminal claim 7, wherein the first reservation signal is transmitted from the base station directly after transmission of the downlink data ends, and
   the LBT is conducted after the first reservation signal is received.

13. A method performed by a base station in a wireless communication system, the method comprising:
   transmitting downlink data to a terminal in a subframe;
   transmitting a first reservation signal in a subframe based on a transmission end timing, a certain time, and a subframe boundary; and
   receiving a second reservation signal in the subframe after a listen-before-talk (LBT) time of the terminal;
   receiving uplink data from the terminal based on the subframe boundary of a next subframe,
   wherein the certain time is a LBT time of the terminal to transmit the uplink data, and
   wherein the first reservation signal, the LBT, and the second reservation signal are transmitted in one symbol interval.

14. The method of claim 13, wherein the subframe containing the subframe boundary is a full subframe or an ending partial subframe.

15. The method of claim 13, wherein the second reservation signal comprises a dummy signal or a wireless fidelity (WiFi) preamble, and
   wherein the WiFi preamble contains information about a physical layer (PHY) rate and a frame length.

16. The method of claim 13, wherein the second reservation signal is transmitted in an interval ranging from the transmission end timing to a start timing of the downlink data of the certain time, and
   an end timing of the certain time matches the subframe boundary.

17. The method of claim 13, wherein the second reservation signal comprises a dummy signal or a WiFi preamble.

18. The method of claim 17, wherein the first reservation signal is in an interval ranging from an end timing of the certain time to the subframe boundary.

* * * * *